US012243446B1

(12) United States Patent
Schmitz

(10) Patent No.: US 12,243,446 B1
(45) Date of Patent: Mar. 4, 2025

(54) ELECTROMECHANICAL LINEAR CONTROL SYSTEM AND METHOD FOR RECEIVING MANUAL INPUT COMMANDS

(71) Applicant: Koby Thomas Schmitz, Los Gatos, CA (US)

(72) Inventor: Koby Thomas Schmitz, Los Gatos, CA (US)

( * ) Notice: Subject to any disclaimer, the term of this patent is extended or adjusted under 35 U.S.C. 154(b) by 0 days.

(21) Appl. No.: 18/655,256

(22) Filed: May 4, 2024

Related U.S. Application Data

(60) Provisional application No. 63/565,128, filed on Mar. 14, 2024.

(51) Int. Cl.
| | |
|---|---|
| *G09B 9/08* | (2006.01) |
| *G01D 5/14* | (2006.01) |
| *G05G 5/03* | (2008.04) |
| *G05G 9/047* | (2006.01) |
| *G09B 9/28* | (2006.01) |
| *A63F 13/245* | (2014.01) |
| *A63F 13/285* | (2014.01) |
| *A63F 13/803* | (2014.01) |

(52) U.S. Cl.
CPC .............. *G09B 9/08* (2013.01); *G01D 5/145* (2013.01); *G05G 5/03* (2013.01); *G05G 9/047* (2013.01); *G09B 9/28* (2013.01); *A63F 13/245* (2014.09); *A63F 13/285* (2014.09); *A63F 13/803* (2014.09); *G01D 2205/18* (2021.05); *G05G 2009/04766* (2013.01); *G05G 2009/04774* (2013.01); *G05G 2505/00* (2013.01)

(58) Field of Classification Search
None
See application file for complete search history.

(56) References Cited

U.S. PATENT DOCUMENTS

| | | |
|---|---|---|
| 4,659,313 A | 4/1987 | Kuster et al. |
| 9,245,453 B1 | 1/2016 | Macalister |

OTHER PUBLICATIONS

Brown, Michael, "Cover-Off Overview of Yoko, PFC, and Logitech Yokes" (Jun. 2017), accessed at: https://www.youtube.com/watch?v=qg2-zL5-XBI.*

(Continued)

*Primary Examiner* — James B Hull
(74) *Attorney, Agent, or Firm* — Stephen E. Zweig

(57) ABSTRACT

Linear control system for flight simulation and other applications. The system employs a moveable handle and handle shaft configured to receive manual user input for linear in-and-out motion over at least a range of several inches and rotation back and forth about the handle-shaft axis. Various rolling contact mechanisms employing a compliant material of appropriate durometer are used to manage friction. Linear motion is detected using a motion-reducing Hall-effect sensor and magnet device, while rotary motion is detected using a different rotary sensor. The device has at least one onboard processor, which can receive, process, and output various sensor measurements to an outside computerized device (such as a computer running a flight simulation program). The onboard processor can also receive actuator commands from the outside computerized device and use them to control onboard linear and rotary actuators to provide haptic feedback to the user.

17 Claims, 17 Drawing Sheets

(56) References Cited

OTHER PUBLICATIONS

CH Products Flight Sim Yoke Quick Start, downloaded from https://dosdays.co.uk/media/chproducts/flight_sim_yolk_manual.pdf, Oct. 8, 2024.

Honeycomb Aeronautical Alpha Flight Controls XPC, downloaded from https://flyhoneycomb.com/collections/honeycomb-flight-sim-hardware/products/alpha-flight-controls-xpc on Oct. 8, 2024.

Logitech G Flight Yoke System User Guide, downloaded from https://www.logitech.com/assets/65148/2/flight-yoke-system.pdf?srsltid=AfmBOoqYjh75deSa7spXq7JpELJfBHF5CWr0pYpOYmhvJNyKH3IYiScO on Oct. 8, 2024 (English version from pp. 1-15 only).

Roger Dodger Blogger, "See Inside the Saitek Pro Flight Yoke", Sep. 10, 2016, https://www.rogerdodger.net/hacks-and-mods/see-inside-the-saitek-pro-flight-yoke/, downloaded Oct. 8, 2024. See also https://www.youtube.com/watch?v=C4b7wYZ2emY&t=4s&ab_channel=RogerDodgerAviation.

VelocityOne Flight Qick Flight Guide, downloaded from https://www.sportys.com/media/pdf/quickflightguide.pdf?srsltid=AfmBOopAP0D4hxhd7OIYNEFY1CFc1q1JH_ssb4X04UXFiwfgQ312Zd6H, downloaded Oct. 8, 2024.

Virtual Fly Yoko Plus Review, https://www.reddit.com/r/flightsim/comments/j7lr3i/virtual_fly_yoko_plus_review/, Oct. 2020 (4 years ago), downloaded Oct. 8, 2024.

Thrustmaster TCA Yoke Boeing Edition, downloaded from https://ts.thrustmaster.com/download/accessories/Manuals/TCA_Yoke_Boeing/TCA_Yoke_Boeing_Edition_user_manual.pdf, downloaded Oct. 8, 2024 (English version from pp. 1-21 only).

* cited by examiner

DETAIL A

Figure 14
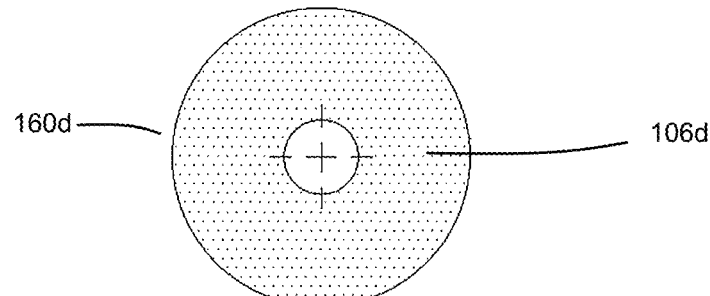
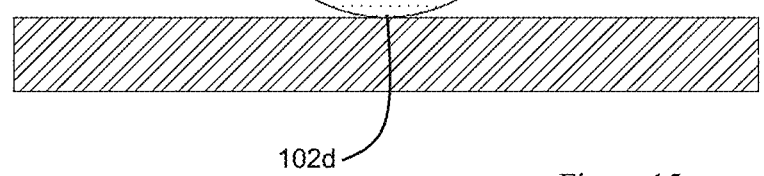
Figure 15
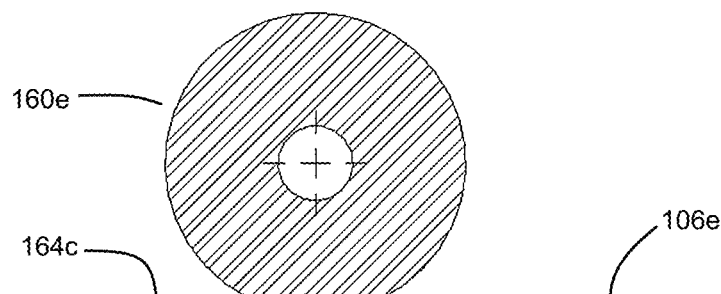
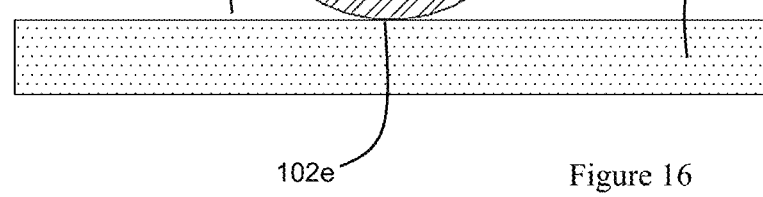
Figure 16
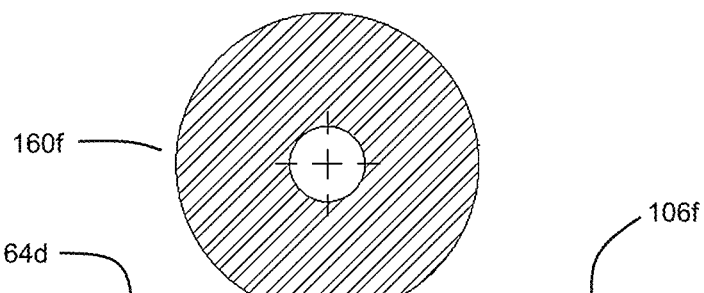
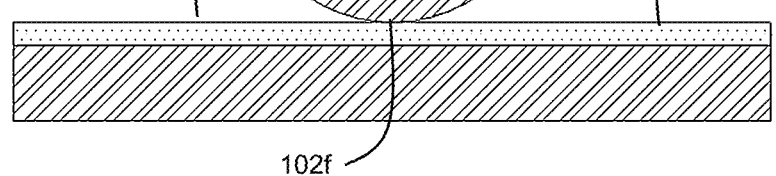

ELECTROMECHANICAL LINEAR CONTROL SYSTEM AND METHOD FOR RECEIVING MANUAL INPUT COMMANDS

CROSS-REFERENCE TO RELATED APPLICATIONS

This application claims the priority benefit of U.S. provisional patent application 63/565,128, filed Mar. 14, 2024, the entire contents of which are incorporated herein by reference.

BACKGROUND OF THE INVENTION

The invention is in the field of user interface devices and input devices for flight simulation and other applications.

FIELD OF THE INVENTION

Modern flight simulation provides the opportunity to replicate the experience of flying an aircraft. Significant advancements in software realism have spurred an increased interest and popularity in flight simulation. Notably, Microsoft Flight Simulator 2020 made an impressive leap by using satellite data to construct an intricate 3D photorealistic model of the Earth for users to explore. The popularity of Microsoft Flight Simulator 2020 prompted a series of flight simulation hardware launches from companies including ThrustMaster, HoneyComb Aeronautical, Turtle Beach, and more. Despite advances in software, hardware realism continues to lag behind.

Various controllers can be used to fly the aircraft in the simulator including a computer mouse, keyboard, gamepad controller, etc. With the goal of realism in mind, many users opt for either a joystick or flight yoke to replicate the controls in the simulated aircraft.

The term "plain bearing" is used to discuss prior art, and the invention. The definition of "plain bearing" is as follows:

Plain Bearing: An element that constrains or guides one or more moving elements to linear motion, rotary motion, or a combination thereof using sliding motion. Plain bearings may or may not use grease or lubricant on the surfaces undergoing sliding friction and may be made of a multitude of materials including ABS, bronze, Teflon, Delrin, copper, steel, polycarbonate, nylon, graphite, rubber, thermoplastics, thermosets, rubbers, elastomers, plastics, neoprene, composites, glass, bimetallic materials, and many other materials. Bushings are the most common type of plain bearing seen in currently available flight simulation yokes.

Prior Art Controllers Include:

CH Products Flight Sim Yoke and Eclipse Yoke:

CH Products produces two affordable flight simulation yokes with nearly identical mechanisms for pitch axis linear guiding and position sensing. On both yokes, the yoke shaft slides through multiple plastic bushings with grease, and a lever arm and rotary potentiometer accomplish pitch axis position sensing.

Logitech G Flight Yoke:

The Logitech yoke uses a lever arm with a rotary potentiometer for pitch axis position sensing and uses plastic bushings and plain bearings with grease to guide the pitch axis along a linear path. A lever arm and potentiometer are used for pitch axis position sensing.

Honeycomb Aeronautical XPC:

The Honeycomb XPC improves the feel of the yoke by using low-cost linear ball bearings and incorporates Hall-effect sensors for position sensing to overcome the limitations of potentiometers.

Turtle Beach VelocityOne:

The VelocityOne uses plastic bushings and plain bearings with grease to guide the elevator axis of the yoke and as a result carries many of the issues and complaints seen in the Saitek and CH yokes. The VelocityOne incorporates Hall-effect sensing on both axes. The pitch axis Hall-Effect sensing method is demonstrated in FIG. 1.

FIG. 1 shows a simplified schematic demonstrating a prior-art Hall-effect linear position sensor (112a) implementation on a prior art yoke.

ThrustMaster TCA Yoke Boeing Edition:

The TCA yoke circumvents the challenges of making a realistic elevator axis by replacing the linear path of travel on the elevator axis with an arced path of travel. Arced travel is accomplished by mounting the handle on a lever arm that pivots about an axis. This configuration is essentially a scaled down version of traditional column mounted yokes found in many aircraft. Using an arced pathway and a pivot removes the need to address the challenges associated with bushings, linear plain bearings, linear ball bearings, and linear position sensing.

Virtual Fly Yoko:

The most popular high-end non-force-feedback yoke is the Virtual Fly Yoko. Compared to the Honeycomb XPC, the Yoko uses higher-cost linear ball bearings that reduce some of noise and vibration. Elevator axis sensing is accomplished with a gear and gear rack that converts linear motion to rotary motion that is then measured by an angular Hall-effect sensor.

The prior art also includes U.S. Pat. Nos. 9,245,453 and 4,659,313.

BRIEF SUMMARY OF THE INVENTION

One important objective of the present invention is to provide methods of improving realism and user experience in flight simulation yokes. Alternate applications and embodiments of the technology will also be discussed.

Aircraft orientation in space, or the attitude of the aircraft, is defined by the angular position of the aircraft about three axes (roll, pitch, and yaw). The roll and pitch attitude reference the Earth's horizon while the yaw attitude reference's the aircrafts flight path. A flight yoke serves to control roll and pitch while rudder pedals are used to control yaw. Pulling or pushing on the yoke handle will cause rotation about the pitch axis, and rotating the yoke clockwise or counterclockwise will cause rotation about the roll axis. The proposed invention focuses on applications to flight simulation yoke designs, but it can be useful in a variety of areas.

Without small and precise adjustments to an aircraft yoke, the attitude of the aircraft will change erratically in response to inputs to the yoke. Sudden, abrupt changes in the attitude of an aircraft may make simple necessary tasks such as landing or maintaining altitude difficult or impossible. The invention is based, in part, on the insight that any binding, friction, detents in the yoke mechanism, or otherwise unexpected changes in the feel of the yoke axes can hinder the small and precise adjustment required to fly. As a general rule, the magnitude of the inputs on the yoke axes should not be limited by the design of the yoke, but rather the capability of the user. Users should be able to make adjustments as small as they are physically capable of without difficulty. Steering wheels in cars allow small adjustments analogous to the adjustments a pilot may need to make during flight. That being said, much smaller inputs are typically required for flying an aircraft than for steering a car due to the generally smaller range of motion in aircraft controls.

The invention is also based, in part, on the insight that adjustments to an aircraft yoke must also be accompanied by forces that center the axes of the yoke in a neutral position. In most flight simulation yokes, the centering force is produced by springs, elastomers, motors, or magnets. The resulting forces on the yoke mechanism pose significant challenges when trying to design a yoke capable of small and precise adjustment. Currently available flight simulation yokes often bind and become gritty from the forces required to center the yoke handle, and the forces on the handle from the user. Reducing the centering force of the simulated yoke would result in a yoke that does not produce realistic resistance to user inputs and is therefore not a viable solution. A cost-effective mechanism capable of allowing small and precise adjustments with a realistic feel is needed.

The present disclosure discusses improved methods of creating a flight yoke with a linear guide that provides a realistic feel and allows small and precise adjustment on both axes.

Accomplishing precision control on the pitch axis will likely require precision linear position sensing capable of detecting small adjustments. As such, extremely precise low-cost linear position sensing solutions with a focus on their applications to flight simulation yokes will be presented as well.

FIG. 2 shows an example of a desktop flight simulation yoke (100) using the proposed invention and having a moveable handle (108) constrained to movement along a linear input axis (110), sometimes called the "elevator axis", and a rotational input axis (120), sometimes called the "aileron axis". Here this handle movement is relative to the device housing (172), which is assumed to be stationary.

About Hall-Effect Sensors:

The invention is also based, in part, on the insight that improved Hall-effect sensing methods would be desirable. Prior art Hall-effect sensing methods generally required a magnet that is at least as long as the range of travel on the elevator axis (110) of the yoke and often times longer. A magnet length equal to or less than the range of motion of the elevator axis may result in irregular changes in magnetic field strength at and around the end of the bar magnet. The large magnets that would be required for a realistic range of motion can also add cost and may interfere with certain electronics. As such, the range of motion on the elevator axis is limited for yokes using this sensing method.

Because magnetic field strength decays exponentially as the distance from the magnet increases, the change in magnetic field strength per unit length will also decrease exponentially as the Hall-effect sensor gets further from the magnet. Apart from requiring signal linearization, the required sensitivity of the Hall-effect sensor must therefore increase as the range of travel on the pitch axis increases in order to detect the smaller changes in magnetic field strength. This can increase the cost of the sensor when implemented in flight yokes that have a realistic elevator axis stroke length. Overall, balancing cost, complexity, and integration of the magnet and sensor makes this method of linear position sensing impractical for longer pitch axis travel lengths.

In particular, some of the deficiencies of the Hall-effect sensing methods used with prior art yokes are:

A large magnet is required for a realistic range of motion on the elevator axis (110). This adds cost and can interfere with certain electronics.

The non-linear decay of magnetic field strength versus distance requires linearization of the Hall-effect sensor output and can require more expensive Hall-effect sensors with greater sensitivity.

The first two limitations restrict the ability to implement longer and more realistic travel lengths on the pitch axis.

The invention is also based, in part, on the insight that currently offered flight simulation yokes do not closely replicate the feel of an actual aircraft yoke. These shortcomings arise from an inability to affordably produce a realistic and smooth linear guide that allows fine adjustment on the elevator axis (110). Moreover, the lack of affordable, precise, and reliable linear position sensing options imposes added constraints on current manufacturers. This invention disclosure will present new methods of addressing these shortcomings as they pertain to flight simulation yokes as well as introduce alternative applications of the invention.

Broadly speaking, most flight simulation yokes available on the market today employ two methods of creating a linear guide for the elevator axis. On one hand, manufacturers simply slide the shaft through bushings or use plain sliding bearings, and may use lubricant to mitigate binding issues and friction. Alternatively, manufacturers may employ linear ball bearings guides. Neither of these solutions realistically replicates the elevator axis control on an aircraft.

In specialized cases, a pivot is used to actuate the yoke along an arced path. While the feel is improved using this method, not all aircraft use this style of yoke. Additionally, desktop yokes require a smaller arc radius making the arc more pronounced and unrealistic.

Guiding the yoke using bushings and plain bearings with grease is a common solution in lower cost yokes, but sticking and binding on both axes are common complaints with these designs. Not to mention the eventual need to reapply grease to maintain optimal performance. For these reasons, creating a linear guide using bushings, plain bearings, or other elements that introduce sliding friction with or without lubrication is not ideal.

If linear ball bearings are selected, lower cost yoke manufacturers are limited to affordable low-cost options. Due to the interaction between the ball bearings and the metal surface the ball bearings are rolling on, these low-cost bearings create noise, vibration, grittiness, and binding. Part of the reason for these issues is the small diameter ball bearings used in affordable linear ball bearing guides. Hard small diameter ball bearings easily transmit otherwise imperceptible surface features as they roll over surface variations. The high tolerances and expensive surface finish required to eliminate these issues removes linear ball bearings as a practical solution for the majority of flight yoke manufacturers, especially in lower cost yokes.

At the bottom of the price range, flight simulation yokes use potentiometers to detect elevator axis position. The high-cycle life of the elevator axis regularly causes premature failure when potentiometers are used. Dead zones, signal output spikes, and non-linearities are some of the most common complaints from users of flight yokes with potentiometers. Manufacturers have solved this issue with non-contact Hall-effect sensors, but simple, cost effective, and uncompromising Hall-effect sensor implementations are absent from the market.

The most common presently used elevator axis Hall-effect implementation involves a rotary Hall-effect sensor actuated by a pinion gear engaged with a gear rack that runs parallel to the elevator axis motion. When the user actuates the elevator axis, the pinion gear rotates, driving the rotary Hall-effect sensor. Common issues with this implementation include gear backlash, added cost and complexity, and maintaining alignment between the rack and pinion. This implementation could also be used with various other angular position sensors such as potentiometers or encoders.

Some manufactures have also implemented Hall-effect sensors by placing a bar magnet at an angle such that the distance between a Hall-effect sensor and the bar magnet increases as the yoke moves along the elevator axis (110). Although this may work at shorter stroke lengths, the magnet size and sensor sensitivity requirements become prohibitive at realistic elevator axis travel lengths.

The present invention addresses the linear guide and linear position sensing limitations in current flight simulation yokes as well as introduces broader applications outside of flight simulation yokes.

BRIEF DESCRIPTION OF THE DRAWINGS

FIG. 14. Method of implementing a compliant rolling contact region where the rolling element is made of a compliant material.

FIG. 15. Method of implementing a compliant rolling contact region where the rolling element rolls on a surface made of a compliant material.

FIG. 16. Method of implementing a compliant rolling contact region where the compliant material is placed between the rolling element and a rigid support.

DETAILED DESCRIPTION OF THE INVENTION

Figure 1:
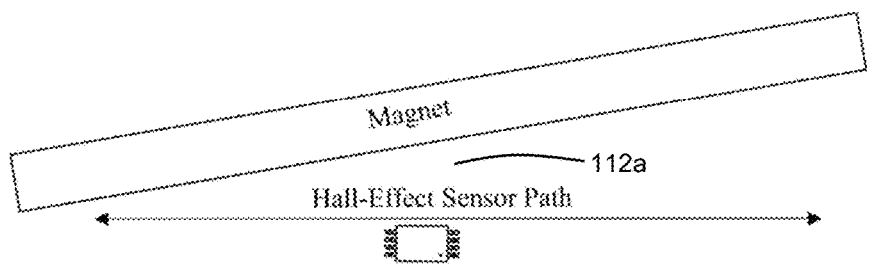
FIG. 1. (Prior art) Simplified schematic demonstrating the Hall-effect linear position sensor implementation on a prior art yoke.

In some embodiments, the invention may be a linear control device (100). This device can comprise various elements including:
a) a moveable handle (108) configured to actuate both a linear input axis (110) and a rotational input axis (120).
b) a compliant material (106, such as 106a, 106b, 106c, 106d, 106e, 106f, 106g, 106h, 106i, and 106j) configured with a durometer between 40 Shore OO to 70

Shore D. This compliant material (106) will usually comprise a polymeric material, often an organic or silicon-based polymer.

c) at least one rolling contact region (102, such as 102a, 102b, 102c, 102d, 102e, 102f, 102g, 102h, 102i, 102j, and 102k) configured for actuation of the linear input axis (110).

d) at least one linear position sensor (112, such as 112a, 112b, 112c, and 112d) and at least one angular position sensor (142, such as 142a and 142b).

e) at least one processor (200).

In some embodiments, this processor (200) may comprise at least one local (on-device) processor configured to interact with the sensors and optional actuators. This handles input and output between the at least one local processor located on the device itself, and a remote processor such as a desktop PC, tablet or laptop PC, gaming device, or remote internet server.

This remote processor is often configured to receive input signals from the local processor pertaining to the status of the local input sensors, act on these input signals to run various types of programs, such as flight simulator programs, and also to transmit commands to the at least one local processor, such as commands to activate the various actuators onboard the device.

In general, the device has at least one rolling contact region (102, such as any of 102a, 102b, 102c, 102d, 102e, 102f, 102g, 102h, 102i, 102j, and 102k) that is configured to at least partially constrain movement of the handle (108) and handle shaft (116) along the linear input axis (110). Generally, at least a portion of this rolling contact region (102) comprises a compliant material (106, such as any of 106a, 106b, 106c, 106d, 106e, 106f, 106g, 106h, 106i, and 106j).

As previously discussed, at least one processor (200) is configured to receive input from the local sensors, such as at least one linear position sensor (112, such as any of 112a, 112b, 112c, 112d) and at least one angular position sensor (142, such as any of 142a and 142b). The processor then uses this input to produce an output (202) responsive to at least a position of the moveable handle (108) and handle shaft (116).

More specifically, in some embodiments, this linear control device (100) can be configured as a flight simulation yoke. In this embodiment, the yoke will further comprise the at least one axis of rotation (FIG. 25, 126) that facilitates rolling contact of the rolling contact region (102). This represents the axis of rotation the rolling elements rotate about. This is separate from the rotational movement of the yoke handle often shown as (120) and often referred to as the rotational input axis.

Figure 25:
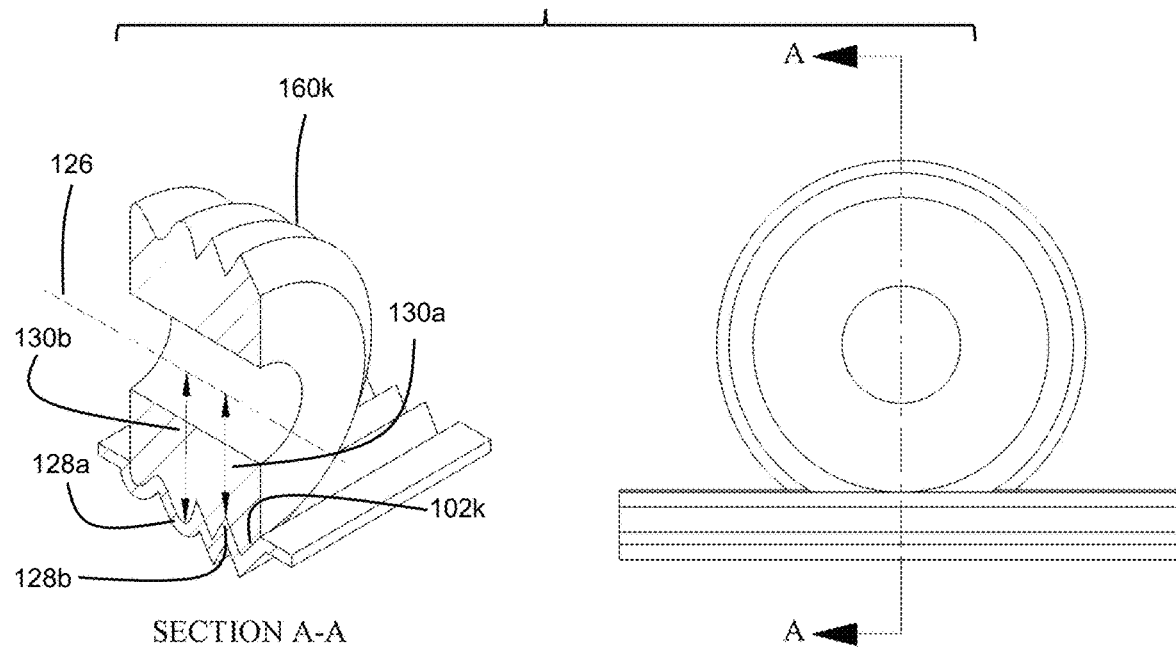
FIG. 25. A rolling element that introduces both rolling and sliding friction along a linear input axis using a rolling contact region that has points at varying distances from the axis of rotation.

Note that as shown in FIG. 25, in some embodiments, the rolling contact region (102) may comprise two or more points (128, such as 128a and 128b) configured with non-equal distances (130, such as 130a and 130b) from the at least one axis of rotation (126). This is designed to induce a controlled amount of friction. That is, in this embodiment, these two or more points (128a and 128b) and the at least one axis of rotation (126) are configured to be coplanar and also configured so that both rolling and sliding friction are present when the linear input axis (110) is actuated.

Linear Control Guide

The surface finish and precision required for linear ball bearing guides to meet the requirements of flight simulation yokes can be more broadly applied to any linear guide in a flight simulation yoke that uses hard rolling elements rolling on a hard surface to constrain the elevator axis (110). Anytime a hard rolling element rolls over a hard surface imperfection while under force from centering springs or user input, the imperfection may be transmitted through the yoke causing noise, vibration, grittiness, and binding. That being said, rolling friction still remains preferable to sliding friction since it reduces the susceptibility to binding and sticking. Since linear ball bearing guides cannot produce a realistic elevator axis at an affordable price, the question then becomes: how can rolling friction be integrated into a linear guide in a flight simulation yoke without degrading the feel and user experience?

To address this issue, a softer material at the rolling contact region, such as polyurethane or other type of polymer, here often called a "compliant material" that does not readily transmit surface imperfections can be used. For example, the elevator axis (110) of a flight yoke may comprise polyurethane rolling elements that roll along one or more surfaces to constrain the yoke's motion to a linear path. Compliant materials are discussed in more detail at the end of this disclosure.

Figure 3:
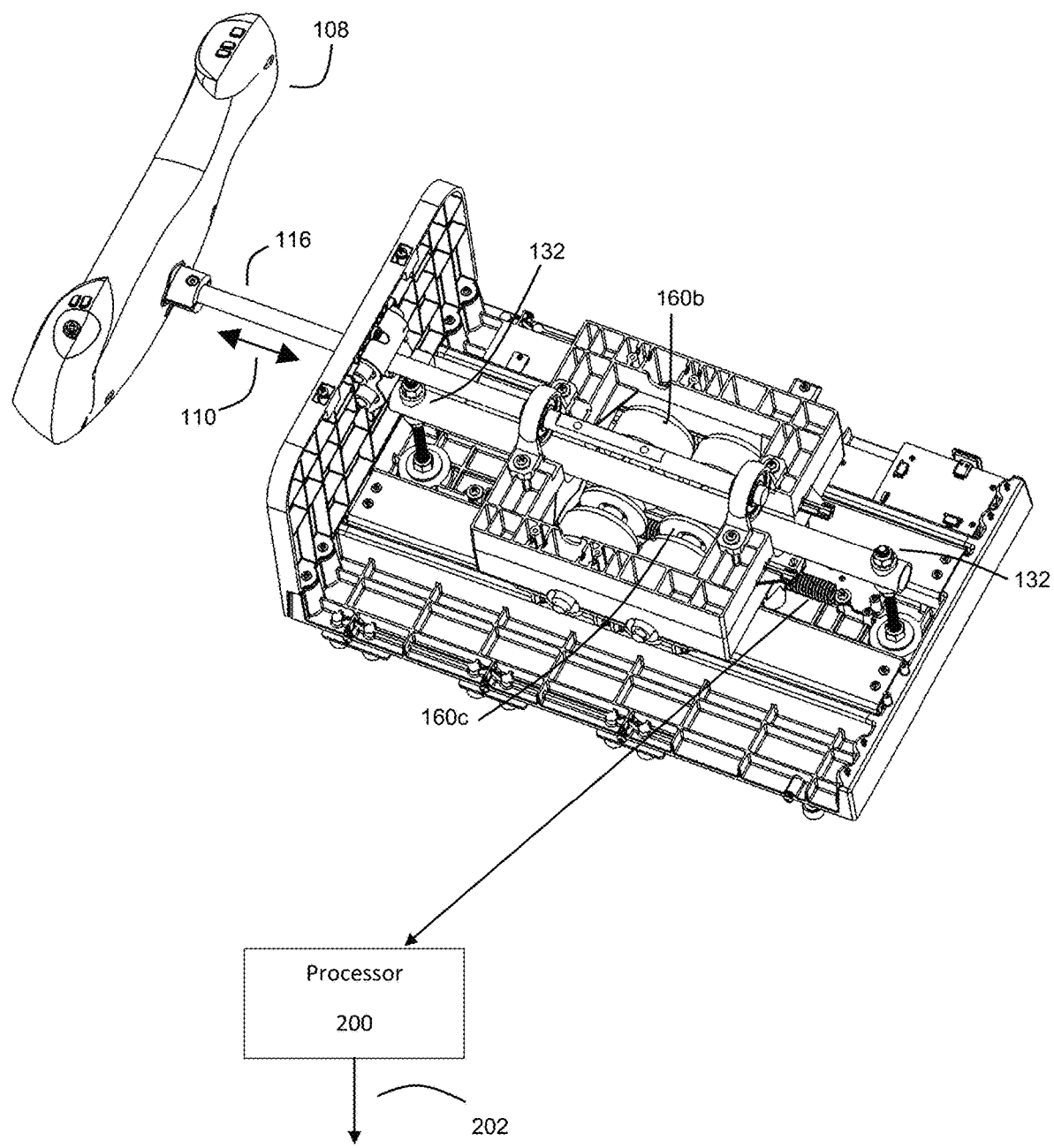
FIG. 3. A flight simulation yoke mechanism using rolling elements to constrain and guide a linear input axis. In this case, the rolling elements are made of a compliant material. The aileron axis sensing and aileron centering spring mechanisms have been hidden to better show the linear guide mechanism.

FIG. 3 shows a flight simulation yoke mechanism constructed using rolling elements (160, such as 160a, 160b, 160c, 160d, 160e, 160f, 106g, 160h, 160i, 160j, and 160k) to constrain and guide a linear input axis (110). In this case, the rolling elements can comprise a compliant material (106, such as 106a, 106b, 106c, 106d, 106e, 106f, 106g, 106h, 106i, and 106j). The aileron axis sensing and centering spring mechanisms have been hidden to better show the linear guide mechanism.

When the linear control device is configured as a flight simulator, the movement of the yoke is used to control the movement of the (simulated) ailerons of the simulated aircraft. Thus, yoke movement is often referred to in the alternative as aileron movements. Similarly, sensors that sense the movement of the yoke are occasionally referred to in the alternative as aileron sensors. If the linear control device was instead configured to simulate a spacecraft, movement of the yoke might alternatively be considered to control the actuation of various spacecraft thrusters, and so on.

Figure 4:
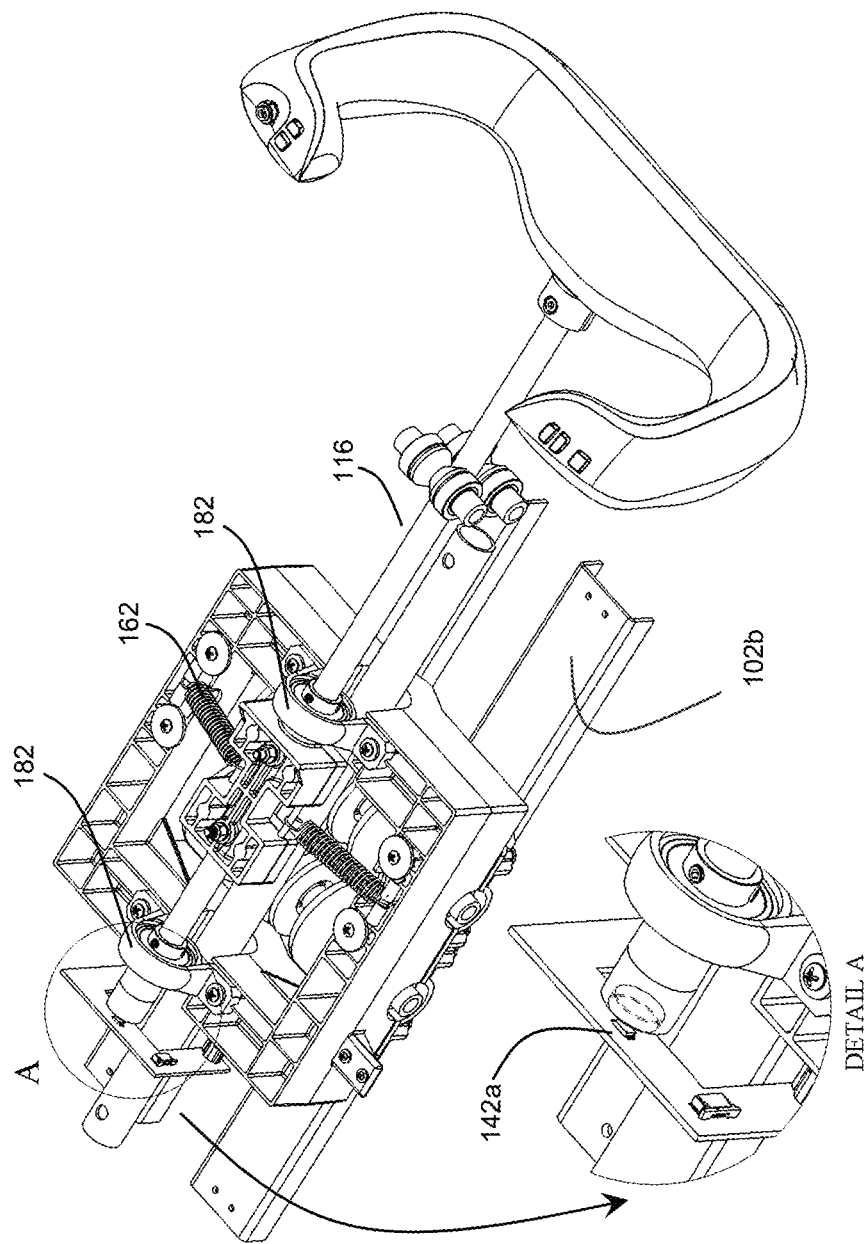
FIG. 4. The flight simulation yoke from FIG. 3 with certain elements hidden, but now showing the aileron sensing mechanism and aileron centering spring mechanism. Aileron sensing is accomplished using an angular Hall-effect sensor and a magnet. Many other angular position sensors may be used as well.

FIG. 4 shows the flight simulation yoke from FIG. 3 with certain elements hidden but now showing the aileron sensing (142a) mechanism and aileron centering spring mechanism (162). Aileron sensing (e.g., yoke position and angle sensing) can be accomplished using an angular Hall-effect sensor and a magnet. Many other angular position sensors may also be used.

Figure 2:
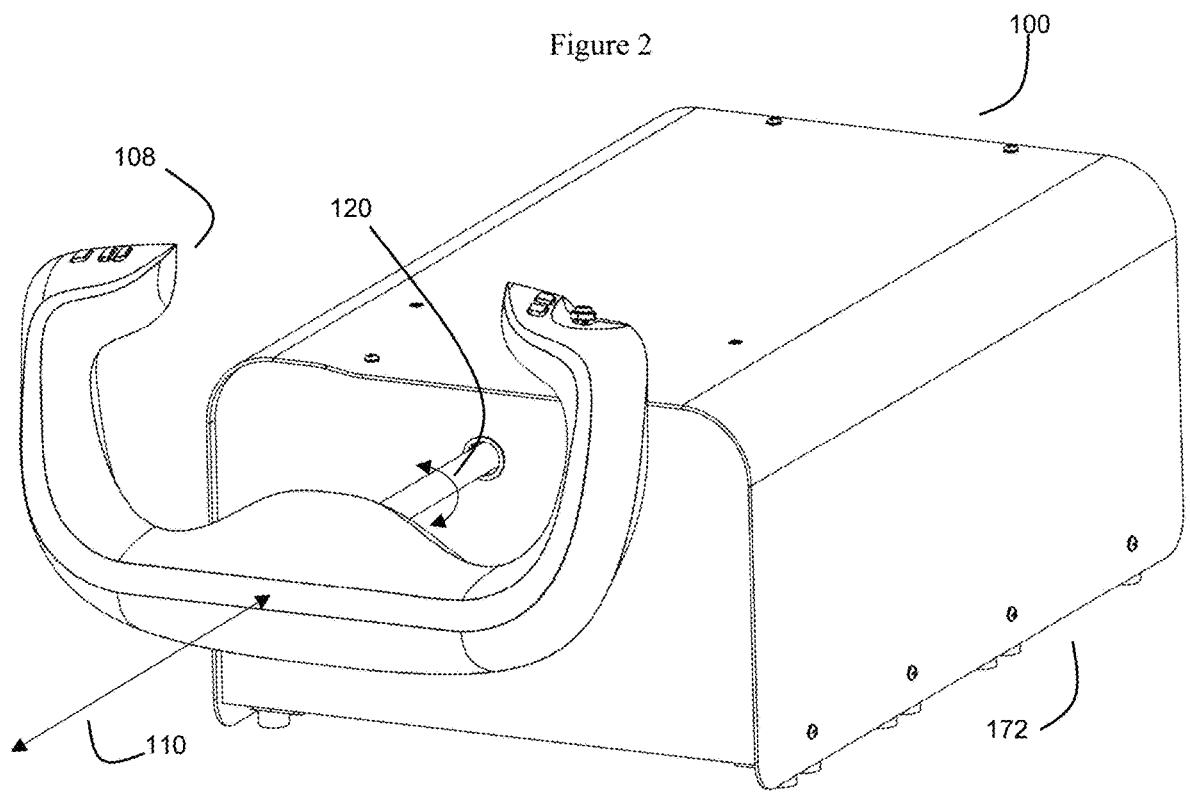
FIG. 2. An example of a desktop flight simulation yoke using the proposed invention and having a moveable handle constrained to movement along a linear input axis and a rotational input axis.

In a preferred embodiment, as shown in FIG. 3 and elsewhere, the linear control device of will further comprise a handle shaft (116) with a handle shaft length (FIG. 26, 156) and a handle shaft axis (FIG. 26, 158); attached to the moveable handle (108). This handle shaft (116) is generally configured with a linear guide apparatus (178, such as 178a, 178b, and 178c) to only move in one dimension parallel to said handle shaft length (FIG. 26, 156), thus creating a linear input axis (FIG. 2, 110). A linear guide apparatus (178, such as 178a, 178b, and 178c) is any element or mechanism configured to at least partially constrain and guide one or more elements along a linear path. In many flight simulation yokes, a linear guide apparatus (178, such as 178a, 178b, and 178c) may be a linear ball bearing guide, a bushing, or a plain bearing. In the proposed invention, a linear guide apparatus (178, such as 178a, 178b, and 178c) consists of rolling elements and surfaces configured to roll along a linear path thus guiding the yoke handle along a linear path of travel.

Additionally, the handle shaft (116) is also configured to rotate about the handle shaft axis (158), thus creating a rotational input axis (120). Additionally, the linear control device (100) is also configured so that at least one rolling contact region (102) is on the handle shaft (116). In order to create a desired haptic feedback effect, the handle shaft (116) is configured so that the at least one rolling contact region (102) on the handle shaft (116) undergoes sliding friction when said rotational input axis (120) is actuated.

Figure 5:
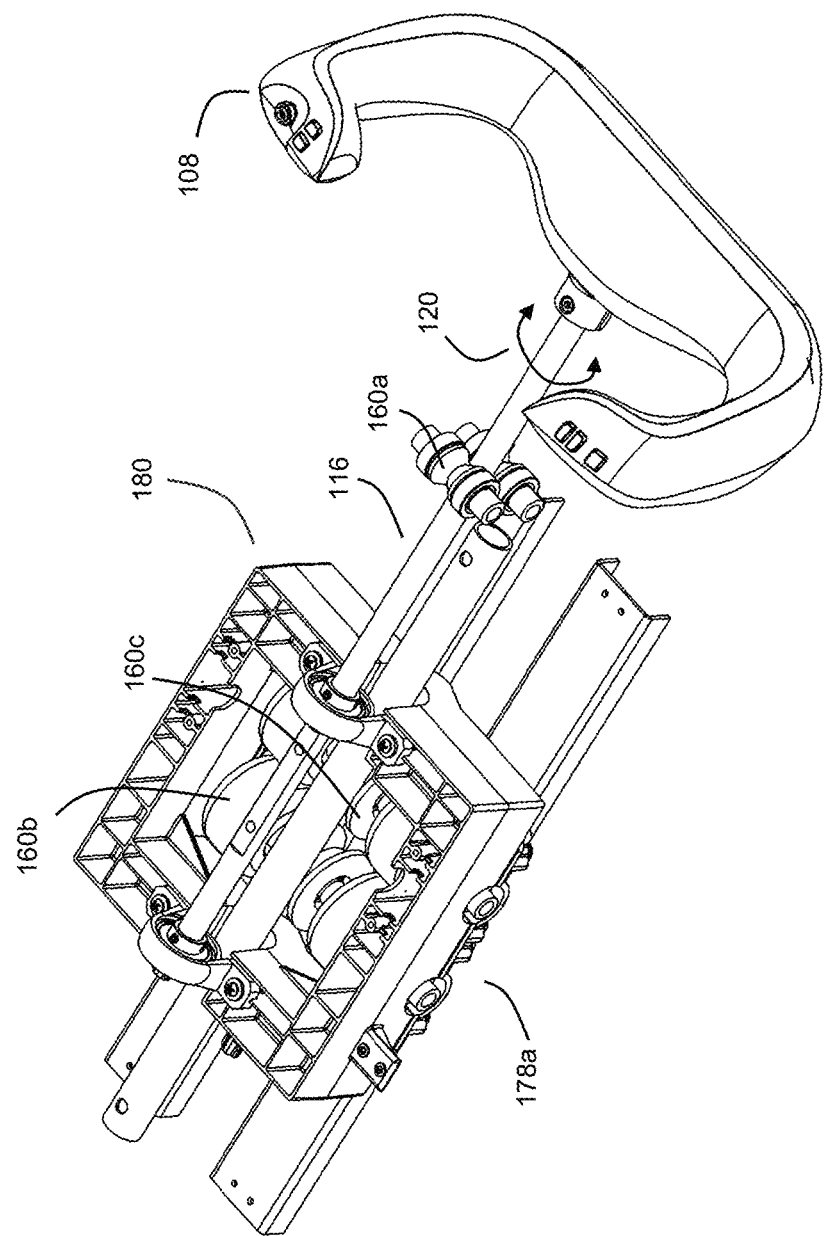
FIG. 5. The flight simulation yoke from FIG. 3 now showing only the essential linear guide components.
Figure 6:
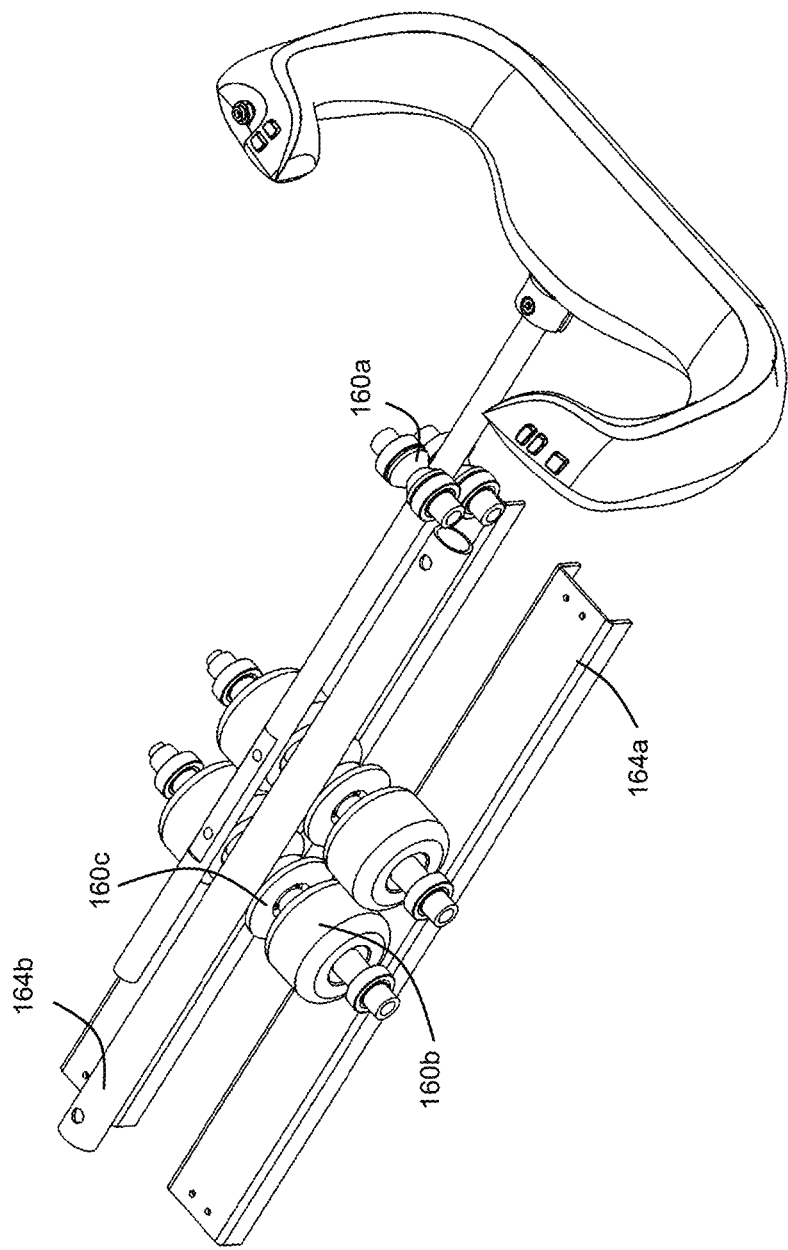
FIG. 6. The flight simulation yoke from FIG. 3 now showing only the rolling elements and respective surfaces that constrain the rolling elements.

Further drawings are shown below. In FIG. 5, the flight simulation yoke from FIG. 3 has been redrawn, now showing only the essential linear guide components. In FIG. 6, the flight simulation yoke from FIG. 3 has been redrawn to only show the rolling elements (160) and respective surfaces (164a and 164b) that constrain the rolling elements (160).

Figure 7:
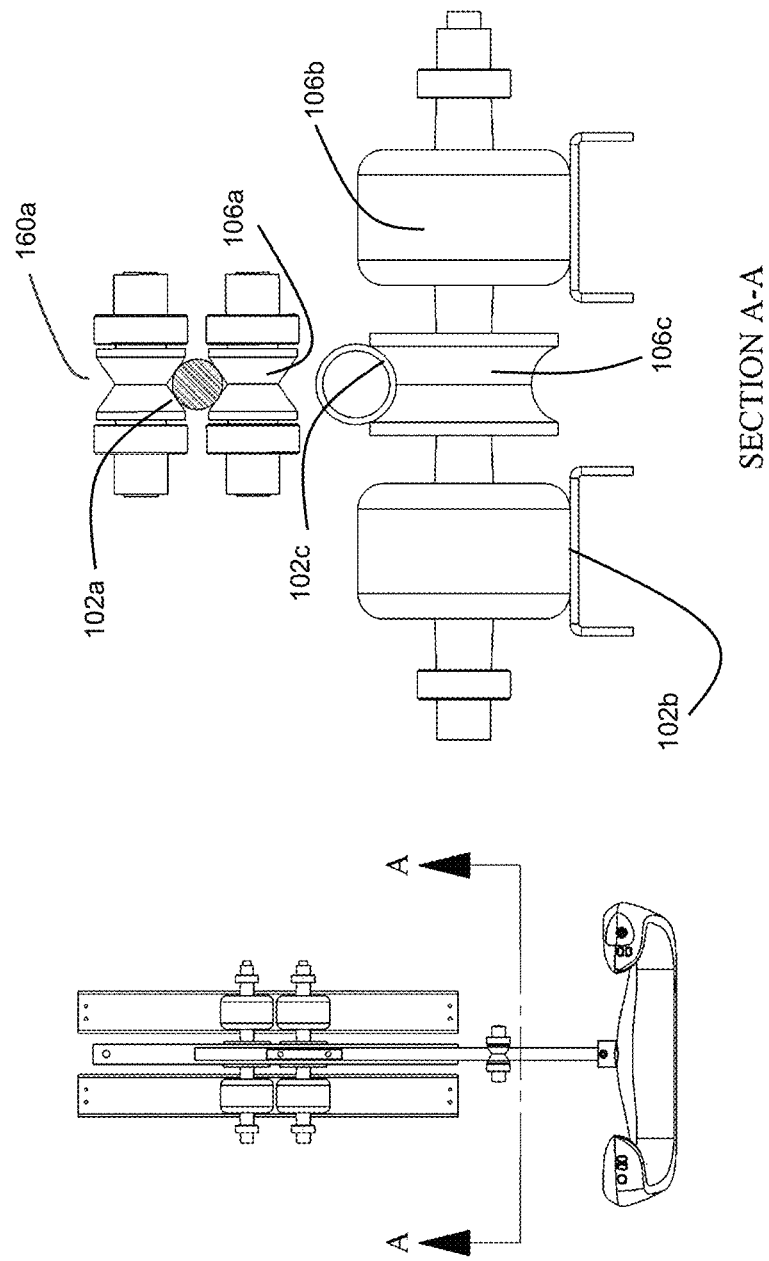
FIG. 7A. A top section view of the elements shown in FIG. 6. The compliant material exists at the rolling contact regions.
FIG. 7B. A side section view of the elements shown in FIG. 6. The compliant material exists at the rolling contact regions.

FIG. 7A and FIG. 7B shows a section view of the elements previously shown in FIG. 6. In this embodiment, the compliant material (106a, 106b, and 106c) is configured to cover at least the surface of the rolling contact regions (102a, 102b, and 102c).

Figure 8:
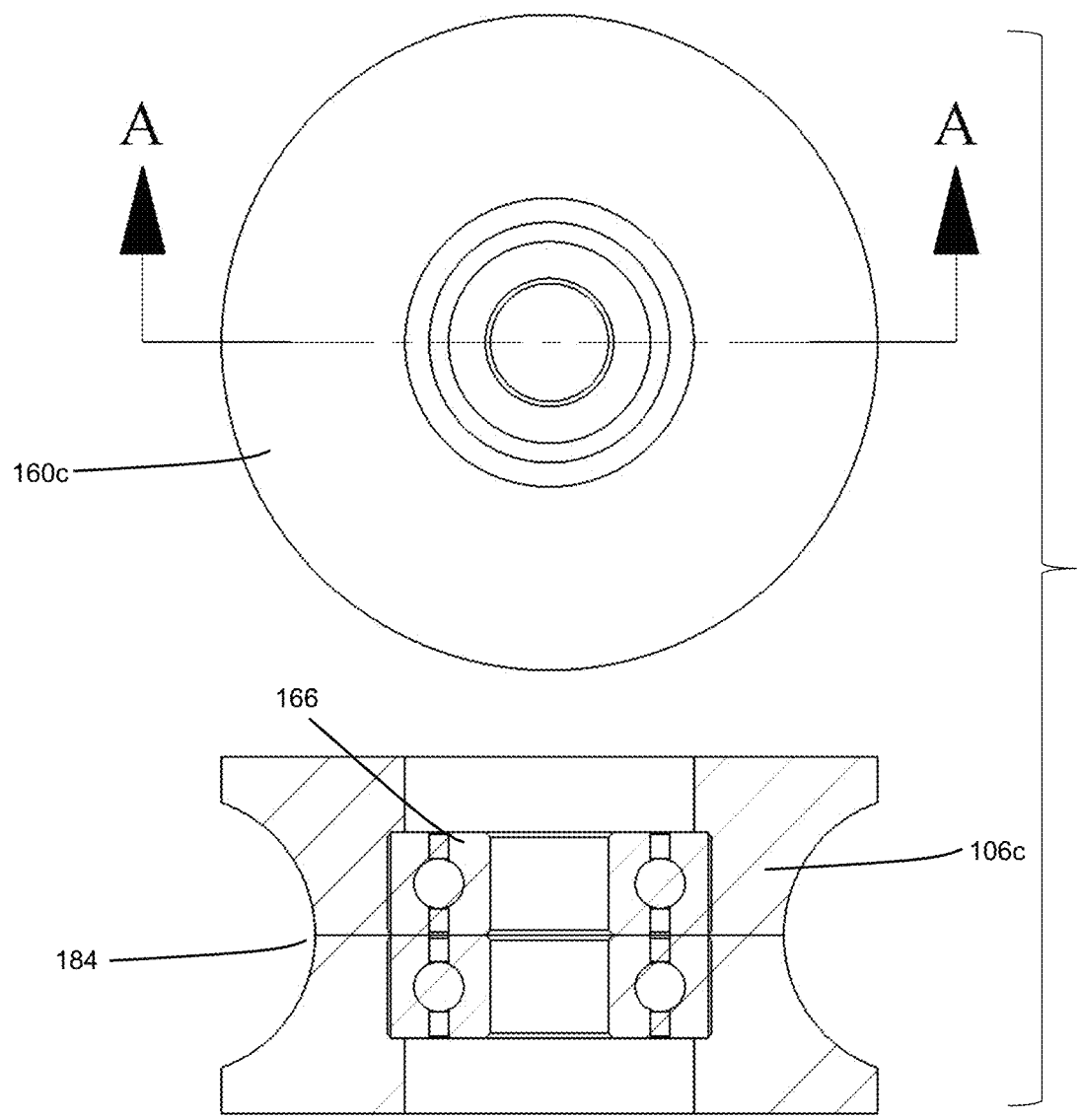
FIG. 8. Section view showing the ball bearings that allow the u-groove rolling elements to rotate in the opposite direction of the cylindrical rolling elements. This necessary since the u-groove rolling elements have a rolling contact region on the top and the cylindrical rolling elements have rolling contact on the bottom.

FIG. 8 shows a section view of the ball bearings (166) that may be used to allow some types of rolling elements (here called u-groove rolling elements 160c) to rotate in an opposite direction of the cylindrical rolling elements (160b). This feature is useful since in this embodiment, the u-groove rolling elements (160c) have a rolling contact region (102c) on the top, and the cylindrical rolling elements (160b) have rolling contact (102b) on the bottom.

In the embodiment shown in FIGS. 3 to 6, the linear control device (a flight simulation yoke) uses two flat sheet metal surfaces (FIG. 4, 164a) and a round steel guide tube (FIG. 6, 164b) to constrain movement of an injection molded carriage (FIG. 5, 180) with polyurethane-coated rolling elements along a linear path. As the handle (108) is pulled along the elevator axis (linear input axis 110), the cylindrical rolling elements roll (160b, 160c) on the flat sheet metal surfaces, and the u-groove rolling elements (FIG. 8, 160c) roll on the bottom of the guide tube (102a). The cylindrical rolling elements and the u-groove rolling elements can rotate independently and in opposite directions when the elevator axis (110) is actuated.

Attached to this injection molded carriage are two pillow block bearings (FIG. 4, 182) that allow the yoke handle to rotate. Together, the yoke handle is constrained to movement along a linear path and rotation about the axial line of the handle shaft. As such, a simulated aircraft's aileron and elevator axis can be controlled by sensing the angular and linear position of the handle.

The flight yoke described here uses drastically lower manufacturing tolerances for the linear guide mechanism. To compensate for lower tolerances and poor surface finish, a polyurethane rolling contact region (here often called a compliant material) that adapts and conforms to dimensional and textural variances in the surfaces is used. This compliant rolling contact region prevents noise, binding, sticking, or other inconsistencies in the feel of the yoke along the elevator axis (110). Despite requiring lower manufacturing tolerances, the performance of the proposed flight simulation yoke greatly exceeds even the performance of yokes using high-end and expensive linear ball bearing guides.

An important aspect for the function of the yoke is the distance between the guide tube (FIG. 9, 170) and the u-groove rolling elements (160c). If the distance between the guide tube and u-groove rolling elements is too large, clearance between the rolling elements and their respective contact surfaces will exist causing unacceptable free play in the system. If the distance is too small, excessive force may be put on the polyurethane. Avoiding excessive force on the compliant material prevents permanent deformation, creep, and compression set in the polyurethane. Deformation in the surfaces of the rolling elements will be noticeable to the user and negatively impact the feel, usability, and realism of the yoke by creating detents. Selecting materials with low compression set and high rebound can also help to reduce and eliminate these issues.

Low manufacturing tolerances of associated components compounded by tolerance stack up of multiple components may prevent the distance between the constraining tube and the flat sheet metal surfaces from being manufactured to a set value. Adjustability may need to be factored into the design.

Adjustability can be economically achieved by fixing opposite ends of the guide tube to threaded studs, bolts, or screws. Doing so allows the height of the guide tube to be set at the factory. A circular guide tube with adjustability in the affixation at the ends allows adjusting the height and angle of the guide tube to account for manufacturing tolerances. It also allows the pressure on the rolling contact region and thus the compliant material to be set. Adjustability in the axis of rotation of the rolling elements and/or the surfaces the rolling elements roll on can be used to set the force on the rolling contact region and compliant material.

Figure 9:
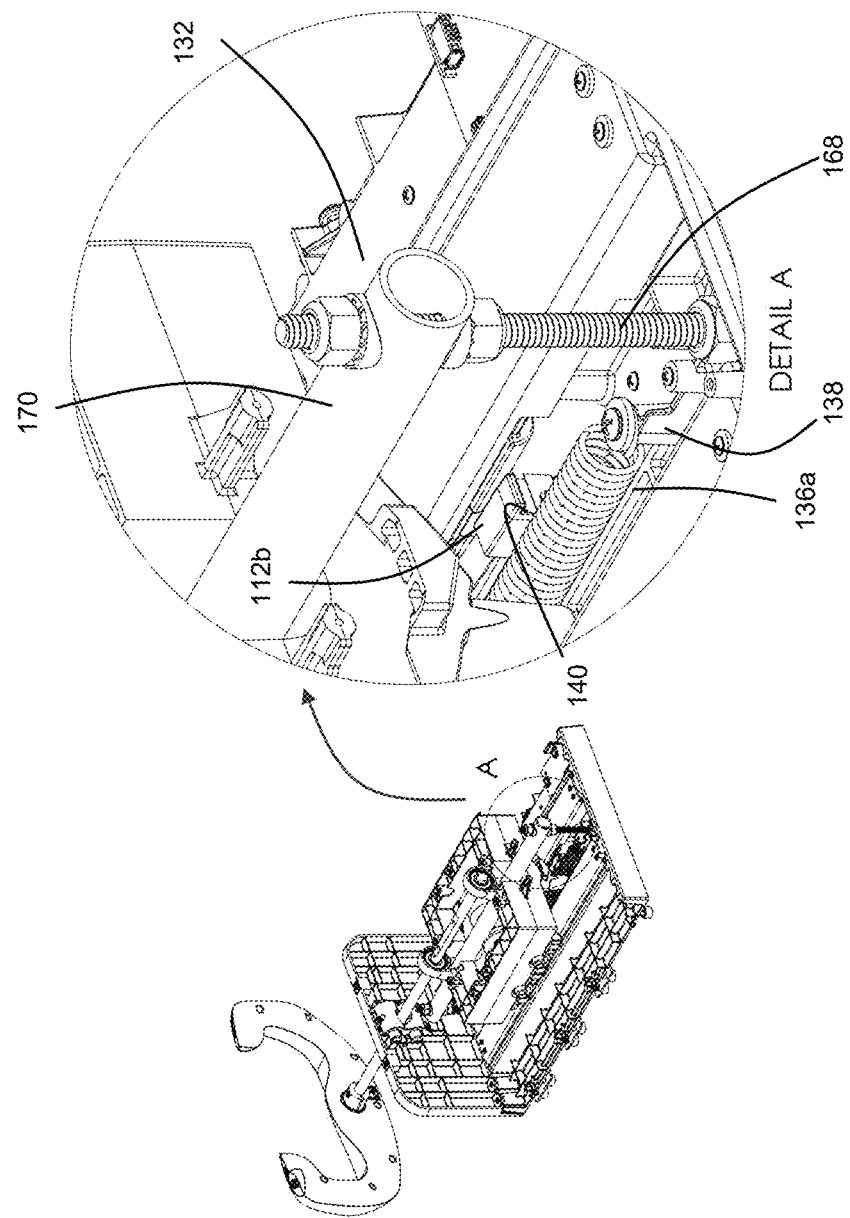
FIG. 9. A method of accounting for manufacturing tolerances and adjusting the force on the compliant material by using threaded studs to adjust the location of a guide tube at both ends. The linear input axis linear position sensor attached to a spring is shown as well FIG. 10. Exploded view showing the location and mounting of the rolling elements providing additional support on the handle shaft where it exits the housing.

FIG. 9 shows a method of accounting for manufacturing tolerances and adjusting the force on the compliant material (106) by using threaded studs (168) to adjust the location of a guide tube (170) at both ends. The linear input axis (110) linear position sensor (112b) attached to a spring (136a) is also shown.

Put alternatively, in some embodiments, the linear control device can further comprise at least one fine adjustment control (132) configured to apply adjustable pressure on said at least one rolling contact region (102) of said compliant material (106).

Material selection also requires durometer considerations. High-durometer materials may not be able to account for manufacturing tolerances and may transmit noise and vibrations to the yoke handle. Low durometer materials can lead to insufficient rigidity in the system, thereby allowing the yoke handle to move and flex during operation. This will be discussed in more detail later in this disclosure.

Prior art flight yokes also suffer from friction and binding at the location where the handle shaft exits the housing of the yoke mechanism. Most, if not all such prior art yokes, use a bushing or plain bearing at this location to improve rigidity. Despite prior art flight yokes having a linear guide mechanism inside the yoke itself, additional support is needed here because the yoke handle shaft can act as a cantilever under user input force. Without additional support, the yoke handle may feel flimsy.

There are three primary issues with using a bushing or plain bearing to support the yoke handle shaft. First off, grease should not be used at this location since it is likely the user will come into direct contact with the shaft. Second, with or without grease, the sliding friction introduced here often creates an unpleasant scraping noise and binds or sticks at this location. Lastly, a clearance fit between the shaft and the bushing is needed to allow the shaft to freely pass through. Yokes, especially those at lower price points, often have a significant amount of free-play as a consequence of the required clearance. Such free play gives the yoke a low-quality feel and degrades the user experience.

Figure 10:
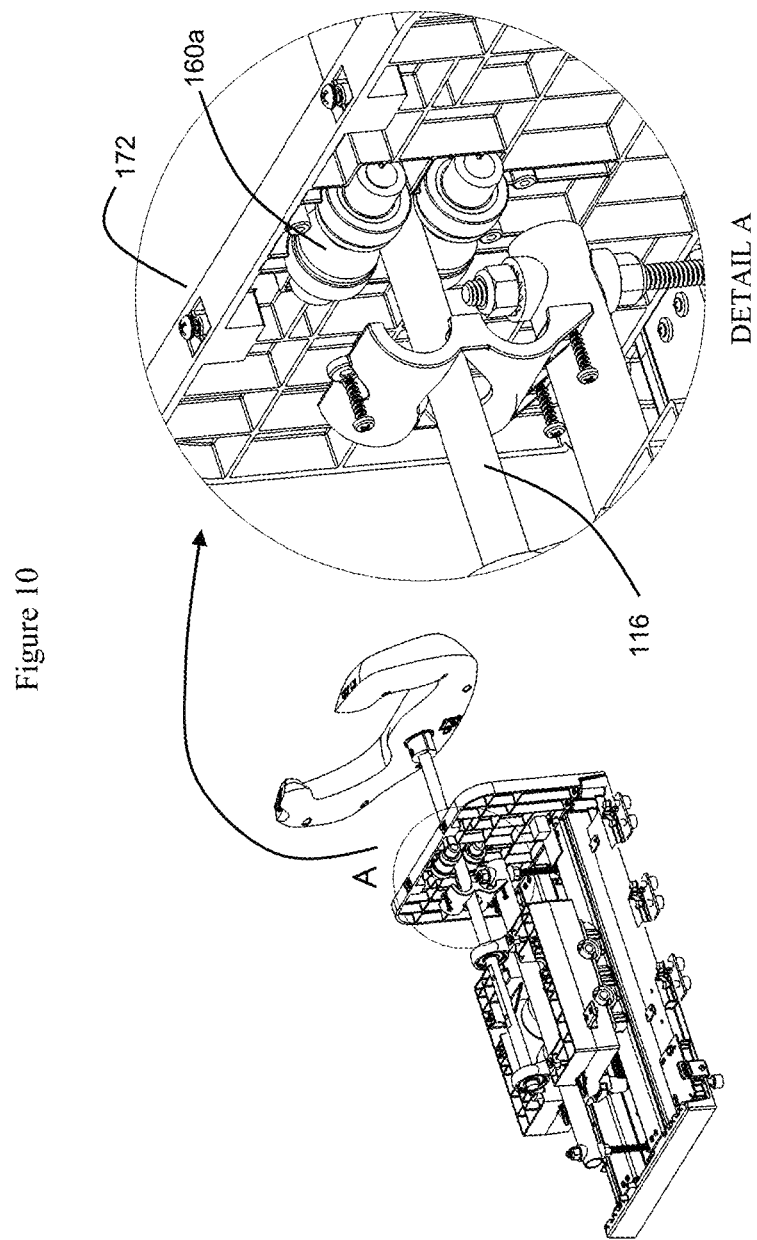

To avoid these issues, additional compliant rolling elements, as shown in FIG. 10, can also be implemented. Due to the compliance in the polyurethane-compliant material, free-play can be eliminated by locating the rolling elements such that they press slightly against the handle shaft (116) at all times. Furthermore, sliding friction is eliminated on the elevator axis (110), removing the need for grease and eliminating binding and unpleasant noise. As before, the polyurethane (compliant material) rolling elements at this location also have the added benefit of compensating for manufacturing tolerances and surface finish on the handle shaft.

FIG. 10 shows an exploded view showing the location and mounting of the rolling elements (160*a*) providing additional support on the handle shaft (116) where it exits the housing (172).

Figure 11:
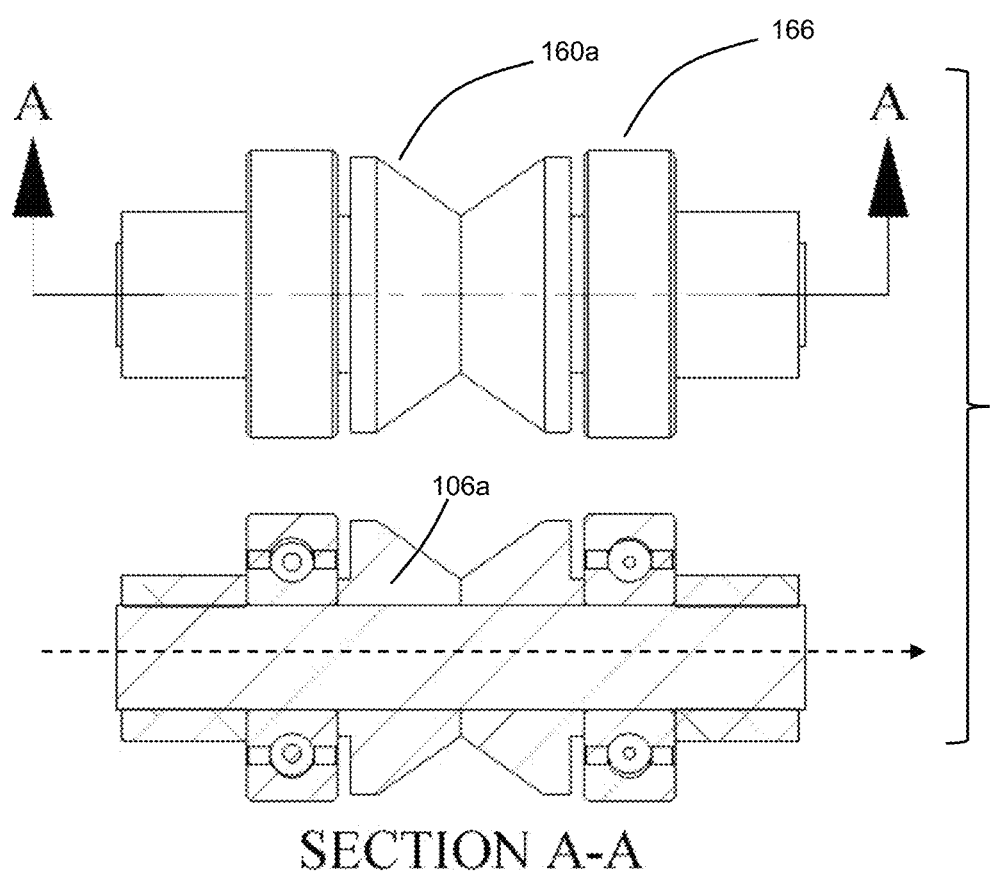
FIG. 11. A section view of the v-groove rolling elements supporting the handle shaft to show the ball bearings that constrain rotation.

FIG. 11 shows a section view of an alternative type of "v-groove" rolling elements (160*a*) supporting the handle shaft (116) to show the ball bearings (166) that constrain rotation of the v-groove rolling elements. In this embodiment, the "v-groove" rolling elements (160*a*) can also constrain rotation of the handle (108) and handle shaft (116) about a rotational input axis (120).

Sliding friction has so far been discussed as a negative characteristic in flight yoke linear guides. There can, however, be circumstances where a certain amount of sliding friction is beneficial. In addition to making a smoother and quieter linear axis, the compliant rolling elements can also be used to introduce a small amount of beneficial friction into the system. With the correct shape, implementation, surface finish, load, and material properties of the rolling elements, this friction can create a dampening effect on the axes of the yoke. The dampened feel of the yoke closely resembles the dampened feel of the aileron and elevator axes in many actual aircraft. Such friction is not present with linear ball bearing guides, and the friction added from bushings and plain bearings is excessive, unrealistic, can cause binding, and creates noise.

One implementation of beneficial friction dampening is using u-groove rolling elements (FIG. 8, 160*c*, see the lower concave section (FIG. 8, 184)) that wrap around the guide tube (170) in FIG. 9. Because the rolling contact region of the u-groove rolling elements has a radius, the rolling contact region undergoes sliding friction with the surface of the guide tube as the rolling elements rotate. As a result, fiction dampening is introduced on the elevator axis (110), and the performance and realism of the yoke is improved. U-groove rolling elements, v-groove rolling elements, and any other rolling element with a rolling contact region with diameter variations about the axis of rotation (FIG. 25, 126) will experience sliding friction when rolling over a surface of a similar profile. Note that this friction would not be present if the rolling contact region only exists at a single point on the surface of the rolling element.

Friction dampening is also introduced on the aileron axis (120). The rolling elements pictured in FIG. 8, FIG. 10, and FIG. 11, where the handle shaft (116) exits the housing (FIG. 10, 172), introduce a small amount of beneficial friction during aileron adjustment. As the handle shaft rotates (120), the small amount of sliding friction on the rolling contact region produces a realistic dampened feel on the aileron axis as well. If desired, the dampened effect could be increased by replacing the v-groove rolling elements (160*a*) with u-groove rolling elements to increase the surface area of the rolling contact region on the handle shaft (116).

The end result of the disclosed linear guide mechanism is a flight yoke that is fully constrained along a linear axis by rolling contact regions. All rolling elements are made of at least an outer coating of polyurethane or other type-compliant material to insulate the system from noise, vibration, or grittiness. The implementation and design of the rolling elements allow the optimal amount of friction dampening to simulate the feel of an actual aircraft. A realistic flight simulation yoke that is smooth and silent during operation and allows users to easily make fine adjustments has been affordably created.

Linear Position Sensing

Figure 12:
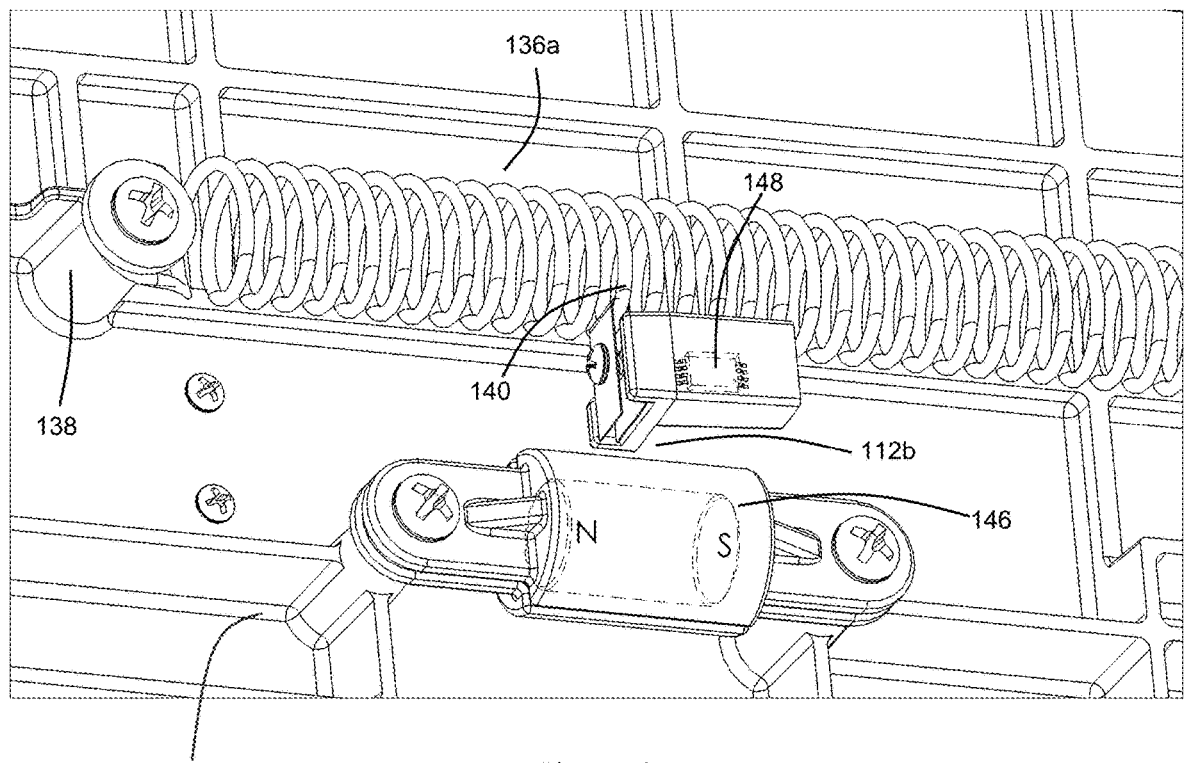
FIG. 12. A method of reducing the linear displacement of a linear position sensor for the linear input axis of a linear control device by affixing the sensor to a spring. Many different elastic elements and linear position sensors may be used.

FIG. 12 shows a method of reducing the linear displacement of a linear position sensor (112*b*) for the linear input axis (110) of a linear control device by affixing the sensor to a spring (136*a*). Many different elastic elements (136) and linear position sensors (112) may be used.

Figure 13:
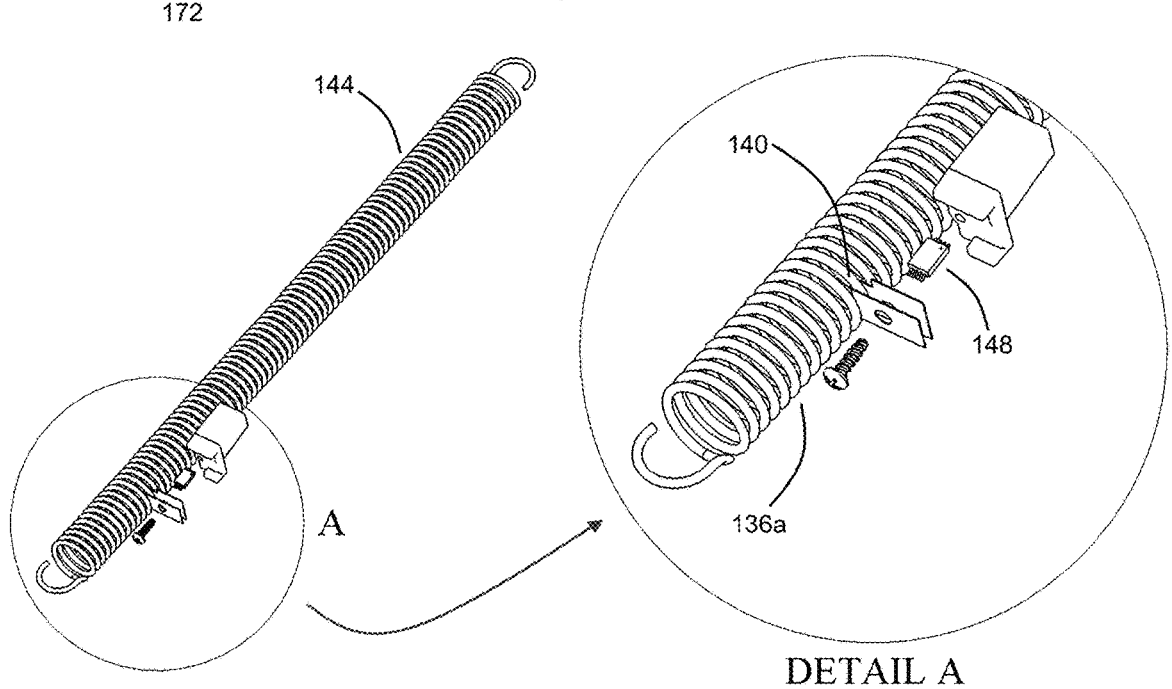
FIG. 13. An exploded view of the Hall-effect spring sensor assembly depicted in FIG. 12.

FIG. 13 shows an exploded view of the Hall-effect spring sensor assembly depicted in FIG. 12.

As previously discussed, in a realistic flight simulation yoke, it is desirable to be able to push and pull on the handle shaft (116) through many inches of play (110), such as in and out by about three to ten inches, such as five inches of play. This can be challenging for certain types of prior-art linear position sensors, such as Hall effect sensors, which typically can only sense distance changes of about an inch or less.

To address the current limitations of linear position sensing in flight simulation yokes, a novel approach to proportionally reducing the span of a linear position sensor while maintaining controlled and synchronized movements is disclosed. Minimizing the required span of a linear position sensor reduces the cost and complexity of the sensor and sensing mechanism. The disclosed invention uses springs and elastic elements to efficiently scale the movements of linear position sensors. FIGS. 12 and 13 depict a method of reducing the required span of an angular Hall-effect sensor using a centering spring in a flight simulation yoke. For clarity, this angular Hall-effect sensor is configured as a linear position sensor despite its manufacturer's intended use as an angular position sensor.

Thus, in some embodiments, the linear control device can further comprise a linear position sensor with at least one elastic element (136, such as 136*a*, 136*b*, and 136*c*) configured to at least partially stretch and contract along with the movement of the handle (108) along the linear input axis (110). This elastic element can comprise a spring (such as 136*a*), but other elastic materials may also be used.

This linear position sensor can further comprise at least one stationary element (FIG. 12, 138, which can also be viewed as an attachment point where the elastic element (136) attaches to the housing 172). This stationary element does not move along with the handle (108) or (shaft 116), nor does it move as the elastic element (136) moves. At least part of the at least one elastic element (136) is further configured to experience differential displacement during the movement of the handle (108) (and shaft 116) so that this least first point (140) on the elastic element (136) experiences a lesser displacement than a second point (144) on the elastic element (136).

Put alternatively, and as can be seen in FIGS. 12 and 13, points (140) on the elastic element (136) that are positioned closer to the stationary element/attachment point (138) will move less than points (144) on the elastic element (136) that are positioned further away from the stationary-element/attachment point (138). By suitably positioning the distance between point (140) and the stationary-element/attachment point (138), the sensitivity and dynamic range of the linear position sensor can be adjusted.

In this embodiment, the at least one linear position sensor (112, such as 112*b*) is configured to sense the position of least the first point (140) on the elastic element (136, such as spring 136*a*). This at least one linear position sensor (112, such as 112*b*) configured to provide input to the at least one processor (200). This processor, in turn, is configured to correlate the output of the linear position sensor (112, such as 112a, 112b, 112c, and 112d) input with the corresponding movement of the handle (108) and shaft (116).

In a preferred embodiment, the linear position sensor (112) and the at least one processor (200) (which again may be any of local-on-device and remote processors) may be configured to sense any of displacement, distance, velocity, and acceleration of the handle (108) and shaft (116). As one example, an onboard or local-on-device processor may simply digitize the linear position sensor reading multiple times per second, and transmit these readings to a remote processor by various methods, such as a USB wired connection, wireless Wi-Fi connection, wireless Bluetooth connection, optical connection (infrared, optical fiber), or other wired or wireless communication means. The remote processor may then translate these readings into the displacement, distance, velocity, and acceleration parameters as desired.

As previously discussed, this sensing method reduces the required span of a linear position sensor in a flight simulation yoke or other linear control device from approximately 5 inches to approximately 1 inch a simple, affordable, and uncompromising manner. As shown, a near-perfect proportionate reduction in travel of a linear position sensor can be accomplished using a common steel extension spring (136a). When the user actuates the elevator axis (110) of the flight yoke, the spring will expand or contract, resulting in a near-perfect proportionate reduction in the linear displacement of the angular Hall-effect sensor. The illustrated mechanism has been verified to detect movements in the moving end of the spring as minute as 0.0001 inches with the likely potential to detect significantly smaller movements.

The Hall effect sensors disclosed herein generally comprise a magnet (146) and a Hall effect sensor (148). One is usually stationary, and the other is usually attached to an elastic element (136), such as spring (136a). Here these will be called sensor elements.

The location of attachment of one of sensor elements to the spring can be used to set the ratio of reduction. Attaching a sensor element to the spring coils closer to the fixed end of the elastic element (138) will result in a larger reduction in displacement (e.g., lesser movement) while attaching a sensor element closer to the moving end will result in a smaller reduction (e.g. greater movement). The exact ratio will depend on the elastic element chosen and the location of the attachment (138). The general idea is to provide a large range of play (110) while still keeping this entire range of movement (110) within the distance range of the magnet (146) and Hall effect sensor (148) chosen for this application.

Thus, in some embodiments, the linear position sensor (112) can comprise at least one magnet (146) and a Hall-effect sensor (148). This magnet (146) and Hall-effect sensor (148) are typically configured with at least one of the two (e.g., one of the magnet (146) and Hall-effect sensor (148) disposed on or in the elastic element (136, such as 136a), and the other the two (magnet 146 and Hall-effect sensor 148) disposed on or in said at least one stationary element (138), or on a stationary portion of the housing (172) proximate this at least one stationary element (138). In FIG. 12, note how the magnet (146) is attached to a region of the housing (172) near the stationary element (138). As previously discussed, this elastic element (136, such as spring 136a) is configured by this motion reduction mechanism so that a given movement of the handle (108) along the linear input axis (110) is translated into a fraction of the given movement of the at least one magnet (146) and hall-effect sensor (148).

Attaching to a spring coil (136a) and achieving high cycle-life requires accounting for the unique bending and twisting motion of the spring coil when the spring stretches and contracts. Attaching a Hall-effect sensor to a spring can be accomplished by clamping onto a coil of the spring. One such instance of this is shown in FIG. 13. Surface finish, material selection, and clamping force all must be considered. In the depicted example, a screw threads into a plastic mount containing an angular Hall-effect sensor such that a sheet metal mount deforms around the spring coil to create a secure and robust connection.

In some embodiments, the Hall-effect sensor (148) may be an angular Hall-effect sensor and still function to detect linear displacement (110). How does this non-intuitive effect work?

This non-intuitive effect is made possible by actuating the angular Hall-effect sensor (148) near an axially magnetized cylindrical magnet (146). Here, the path that the angular Hall-effect sensor travels along is parallel to the axial line of the magnet. When done at the correct distance with the correct magnet specifications, a mostly linear relationship between the change in magnetic field angle versus the distance traveled by the sensor with respect to the magnet can be observed for sensing lengths near that of the cylindrical magnet.

The linear position sensing invention provides added benefits in applications requiring mechanical flexibility in the linear mechanism. Implementing a compliant rolling element guide mechanism in a flight yoke requires a linear position sensing method that can adapt and flex with a compliant system. Using an elastic element to mount the linear position sensor provides this flexibility. Although the system may exhibit error, this error is negligible for many applications. Together, the synergistic benefits of a compliant linear guide coupled with a compliant linear position sensing mechanism provide an opportunity to bring an uncompromised and affordable flight simulation yoke to market.

Other Applications and Embodiments

Although the figures and description have primarily focused on flight simulation yoke design. The disclosed invention also has alternate applications and embodiments as well.

Compliant Linear Control Guide:

Although the compliant interface was inspired by a desire to replicate a flight yoke, the device's ability to make precise and fine adjustments makes the device useful in a variety of other types of computer input and control devices. In flight simulation, the linear guide method may have useful applications in rudder pedals, throttle quadrants, joysticks, and other flight simulation hardware. More broadly speaking, virtual reality controllers, video game controllers, simulation controllers, and computer input devices as a whole stand to benefit from the technology by implementing linear controls in areas that current technology is too expensive for.

Robotics and industrial equipment also benefit from the disclosed system and methods. Being able to effectively and precisely control equipment and robotics using a linear axis is necessary in many applications. The proposed invention allows robotics and industrial equipment manufacturers to cost-effectively introduce linear control axes with equal or better performance than the current state of the art. CNC machines, 3D printers, aircraft, helicopters, drones, unmanned aerial vehicles, remote control aircraft, manufacturing robots, manufacturing machines, surgical robots, surgical machines, vehicles, vessels, spacecraft, fly-by-wire systems, satellites, human-interface-devices, human input devices, prosthetics, or any other device using a linear control axis can benefit from the proposed invention.

However, the compliant rolling contact region is implemented, material choice will have a significant impact on the performance of the linear control guide. Many factors must be considered all with different effects on the linear guide performance.

Below is an outline and explanation of some of the material properties that should be considered during material selection:

Durometer and Hardness: Insufficient durometer or hardness may lead to poor rigidity, causing the handle to flex during operation. A durometer or hardness that is too high may transmit imperfections and may be unable to account for tolerances and variability in the linear guide components.

Material Thickness: If the material is too thin it may be fragile and unable to account for tolerances and variability in the linear guide components. On the other hand, a material that is too thick may again cause insufficient rigidity.

Compression-Set: If the compliant material is permanently deformed due to compression set, detents and other abnormalities in the feel of the linear control may be present. Since the compliant interface will be stored under load in a deformed state, it is important to ensure it returns to its original shape to avoid detents.

Cross-Link Density: Polymer cross-link density has the potential to greatly lower the compression set. A higher cross-link density can help to ensure the material returns to its original shape.

Polymer Chain Mobility: Chain mobility contributes to compression set resistance in certain polymers by ensuring the polymer chains can return to their original position after being deformed.

Elasticity: Elasticity is determined by a multitude of factors and provides another metric for determining the likelihood a compliant material will return to its original shape after deformation.

Friction Coefficient: The coefficient of friction between the rolling elements and the surfaces they roll on can help determine the amount of friction dampening present on the control axes.

Fillers and Reinforcements: Additives are common for optimizing the properties of polymers and can be used to increase the durability, friction coefficient, durometer, elasticity, compression set, and many other factors affecting the performance of the linear guide.

Manufacturability: Injection molding, casting, and extruding are examples of manufacturing processes that can affordably produce components for the compliant interface at scale. Selecting materials that are compatible with cost-effective manufacturing methods can reduce cost.

Resistance to Environmental Degradation: Depending on the application, the compliant interface may be exposed to extreme temperature, humidity, chemicals, UV radiation, and other environmental factors that can degrade and damage materials. As such, material properties must be selected to match the application environment.

The compliant material can be attached to or comprising the rolling element, attached to or comprising the surface the rolling element contacts, or placed in between the rolling element and the surface the rolling element contacts. However, the compliant interface is implemented; the key is avoiding a hard rolling element rolling over a hard surface. FIGS. 14 through 18 display these configurations.

FIG. 14 shows a system and method of implementing a compliant rolling contact region (102d) where the rolling element (160d) is made of a compliant material (106d).

FIG. 15 shows a system and method of implementing a compliant rolling contact region (102e) where the rolling element (160e) rolls on a surface (164c) made of a compliant material (106e).

FIG. 16 shows a system and method of implementing a compliant rolling contact region (102f) where the compliant material (106f) is placed between the rolling element (160f) and a rigid support.

Figure 17:
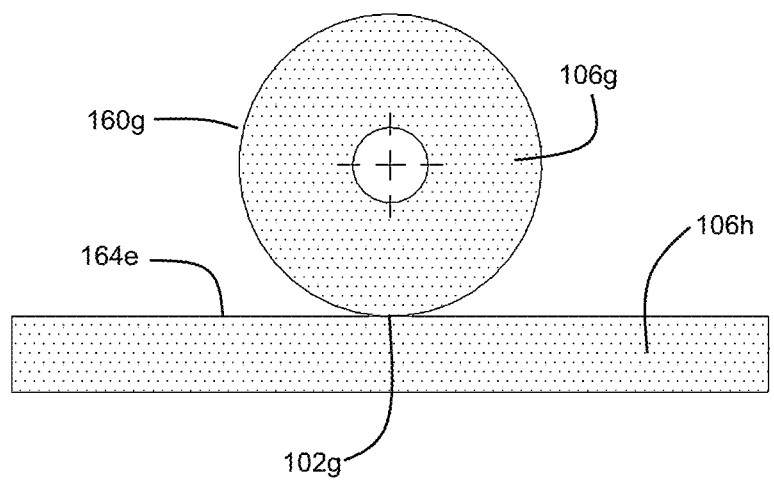
FIG. 17. Method of implementing a compliant rolling contact region where the rolling element and/or the surface of the rolling element rolls are made of a compliant material.

FIG. 17 shows a system and method of implementing a compliant rolling contact region (102g) where the rolling element (160g) and the surface (164e) the rolling element (160g) rolls on are made of a compliant material (106h and 106g).

Figure 18:
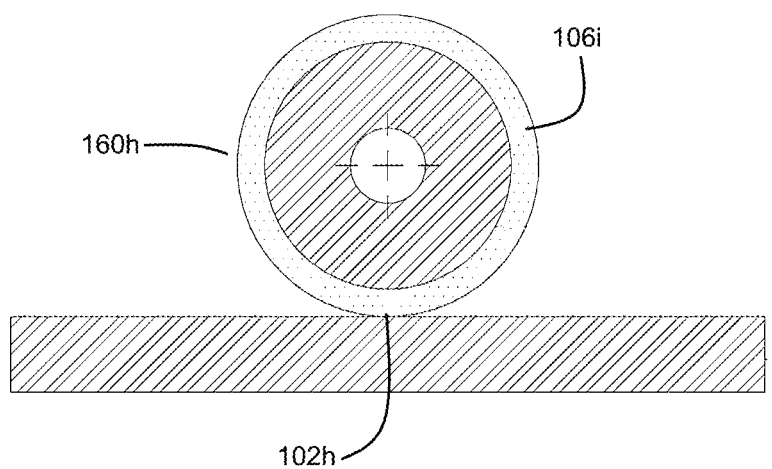
FIG. 18. Method of implementing compliant rolling contact where a contact layer made of a compliant material is on the surface of the rolling element.

FIG. 18 shows a system and method of implementing compliant rolling contact (102h) where a contact layer made of a compliant material (106i) is on the surface of the rolling element (160h).

So far, linear guide methods have used polyurethane (compliant material) rolling elements. These could either be solid polyurethane or can comprise a core of another material (metal, alternative type of plastic) coated with a compliant material such as polyurethane on at least one surface that comes into rolling contact with other materials. FIG. 16 demonstrates an implementation of a polyurethane-based compliant material coated (106d) on top of a surface (164d) that comes into contact with steel rolling elements (160f) to create a compliant rolling contact region. Polyurethane was used for this example, but many different polymers, rubbers, elastomers, and plastics could be used as an alternative type of compliant material.

Figure 19:
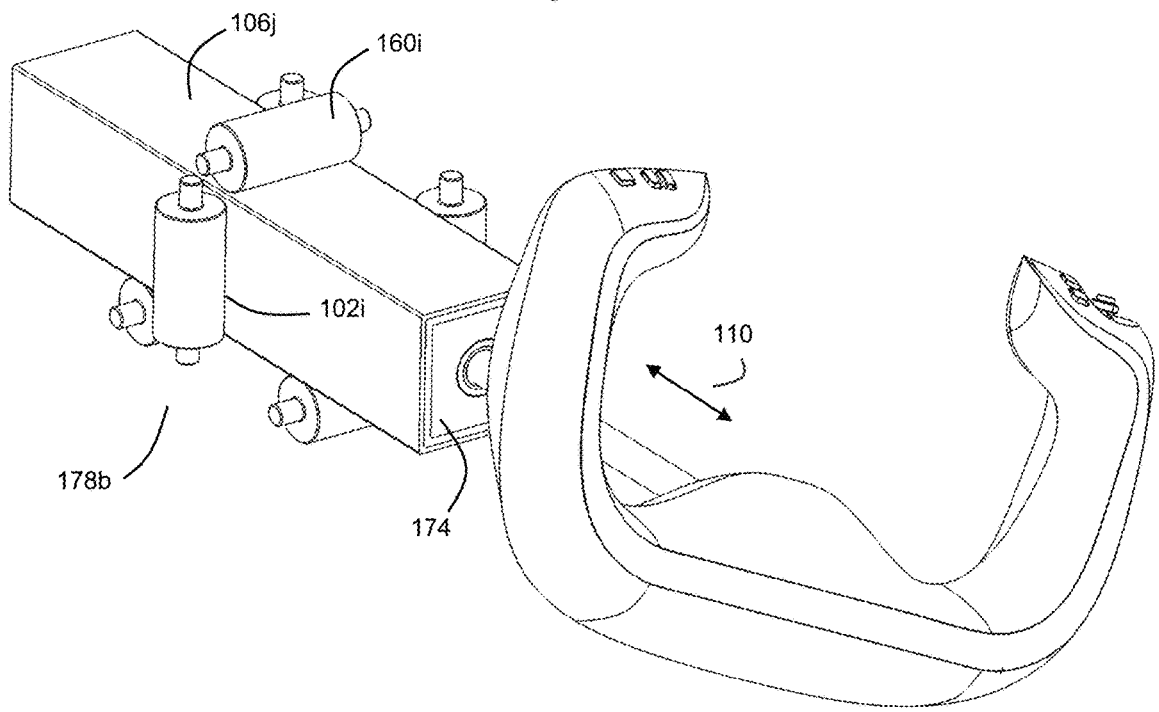
FIG. 19. Another embodiment of the proposed invention, here using six fixed rolling elements rolling on a compliant-material-coated square tube to constrain and guide a linear input axis.

FIG. 19 shows another embodiment of the proposed invention, here using six fixed rolling elements (160i) rolling on a compliant material (106j) coated square tube (174) to constrain and guide a linear input axis (110).

Using rolling elements in flight simulation yokes also introduces economical force feedback and haptic feedback options. Prior art yoke designs that employ centering springs tend to be unsatisfactory. These centering springs limit the realism of a simulation yoke because the forces exerted on the yoke handle by the centering springs are only proportional to the displacement of the handle. In an actual aircraft, the forces on the yoke are largely determined by the air pressure on the control surfaces. This force feedback gives pilots valuable information about the flight dynamics of their actual aircraft.

Creating a More Realistic Simulation

By driving torque to one or more of the rolling elements, a linear force can be exerted on the handle to simulate force variations in the elevator axis controls of an aircraft. Unlike competing products, the proposed invention provides a simple and cost-effective opportunity to add force feedback and haptic feedback without significant redesign or adding many components. Prior art flight simulation yokes generally require separate components for the linear guide mechanism and the mechanism that converts motor torque to linear force. The most common currently available configuration involves a linear ball bearing connected to a belt, which is, in turn, driven by a DC motor or other type of actuator.

Thus, in some embodiments, the linear control device may further comprise at least one linear actuator (134) configured to apply force to at least one rolling contact region (102), thereby exerting a linear force on the handle (108). Here, this linear actuator (134) and at least one processor (200) may be further configured to provide force feedback, haptic feedback, vibration feedback, warnings, alerts, or other feedback to the handle (108), often by way of the handle shaft (116).

Figure 24:
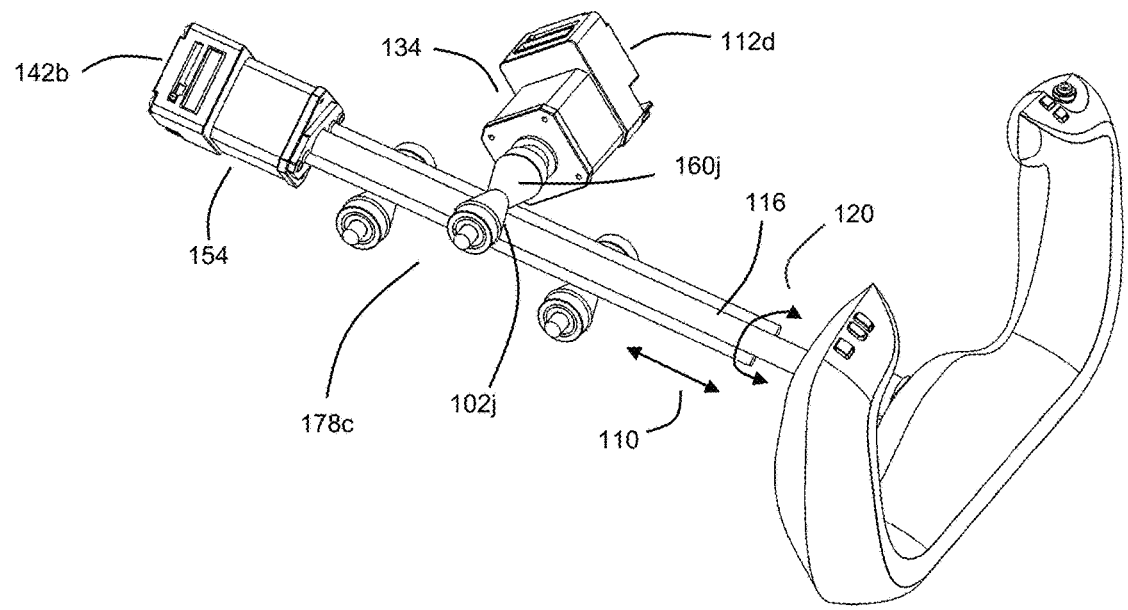
FIG. 24. A linear control device using rolling elements made of a compliant material to constrain and guide a linear input axis. A motor configured as a linear actuator drives torque to a rolling element to exert a linear force on the handle. A second motor configured as a rotational actuator provides torque-mediated force about a rotational input axis.

FIG. 24 demonstrates one embodiment of force feedback in a flight simulation yoke using linear guide rolling elements and a compliant interface. The fixed elevator axis motor can exert linear force on the handle through one of three fixed polyurethane v-groove rolling elements. Aileron feedback is provided by a second motor coupled to the yoke handle shaft. The aileron feedback motor is held in place by two shafts running in between the rolling elements and parallel to the handle shaft. This allows the aileron axis motor to move linearly with the elevator axis while also being capable of applying torque to the aileron axis.

FIG. 24 shows a linear control device using rolling elements (160j) made of a compliant material (106) to constrain and guide a shaft (116) along a linear input axis (110). A motor or actuator configured as a linear actuator (134) drives torque to a rolling element (160j) to exert a linear force on the shaft (116) and handle (108) for providing any of torque mediated force feedback, haptic feedback, vibration feedback, warnings, alerts, and/or other feedback to the handle (108) along this linear input axis (110). A second motor or actuator configured as a rotational actuator (154) provides any torque-mediated force feedback, haptic feedback, vibration feedback, warnings, alerts, and/or other feedback to said handle (108) about a rotational input axis (120). In this embodiment, an angular position sensor configured as a linear position sensor (112d) senses the position of a linear input axis (110), and another angular position sensor (142b) senses the position of a rotational input axis (120). Both sensors are attached to the actuator shafts and connect to the processor (200).

The aileron feedback motor (154) is constrained to a linear path, and the motor housing is prevented from rotating by the same complaint rolling elements comprising the linear guide mechanism. Since the aileron axis motor (154) must travel linearly with the yoke handle (108) and yoke handle shaft (116), the element used to mount this motor must also travel linearly with the handle and shaft assembly.

In contrast to the present art, prior art force feedback yokes often use elevator axis linear ball bearings to constrain rotation of their aileron axis force feedback motor. As a result, when the prior art feedback motor applies torque to the aileron axis, the linear ball bearings, bushings, or plain bearings constraining the elevator axis are subject to substantial loading. Binding, vibration, noise, and grittiness are common consequences of this prior art loading situation, and mitigation of this prior art problem requires far more expensive linear ball bearings. These expensive, high-end linear ball bearings are a significant cause of the high price of current force feedback yokes. Therefore, introducing a compliant interface and rolling elements on a force feedback yoke can allow an affordable force feedback yoke to enter the market.

Thus, in some embodiments, the linear control device can further comprise at least one rotational actuator (154) configured to apply torque about the rotational input axis (120, 126) and to the handle shaft (116) and handle (108). This at least one rotational actuator (154) and at least one processor (200) may be further configured to provide any of torque mediated force feedback, haptic feedback, vibration feedback, warnings, alerts, and/or other feedback to the handle shaft (116) and handle (108).

Figure 26:
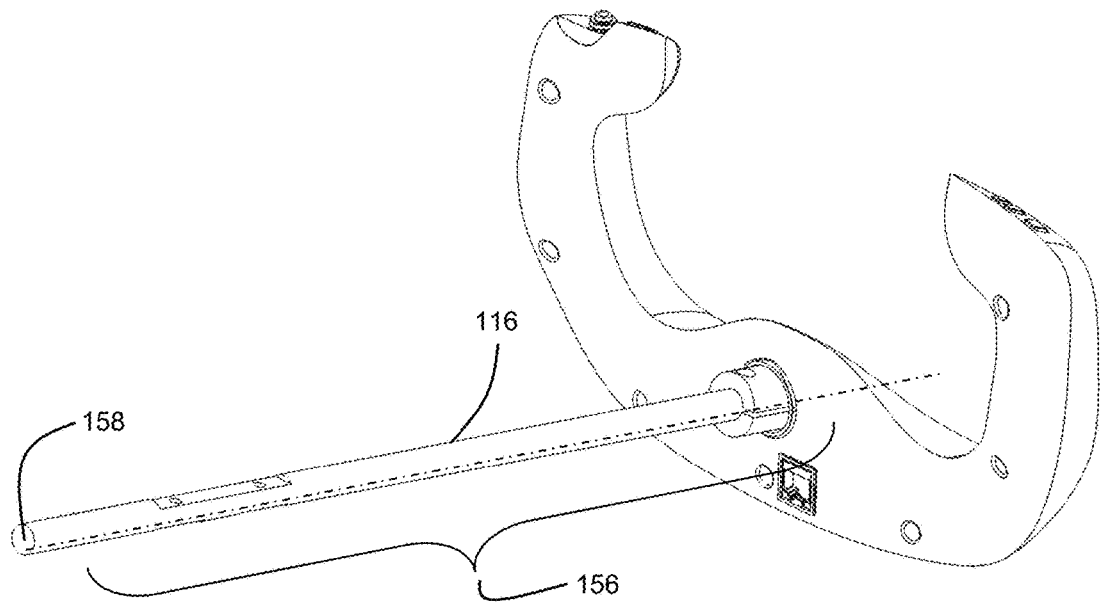
FIG. 26. An example of a handle shaft length and handle shaft axis are shown.

FIG. 26 shows an example of a handle shaft (116), with a handle shaft length (156), and handle shaft axis (158).

The embodiment shown in FIG. 24 represents a method of accomplishing force feedback on both axes, elevator axis (110) linear guiding, and aileron axis (120) rotational guiding using just three v-groove rolling elements. In a preferred embodiment, the v-groove rolling elements incorporate friction dampening on the rotational input axis (120). Replacing one or more of the v-groove rolling elements with u-groove rolling elements would incorporate friction dampening on both the linear input axis (110) and rotational input axis (120). This is a simpler, more economical, and better-performing design relative to the prior art.

The rolling contact region slipping and losing grip or traction may be an issue when implementing force feedback by driving torque to the rolling elements. To mitigate these issues, patterns, features, and textures can be added to the driven rolling elements and/or the surfaces of the driven rolling elements to increase grip. The ability to implement patterns, surface features, and textures into polymers, elastomers, rubbers, and plastics is another benefit of using a compliant interface in a force feedback flight simulation yoke.

Thus, in some embodiments, the rolling contact region (102) may further comprise any of textures and surface features designed to interlock and mesh together during movement, thus allowing for higher torque transmission when the linear actuator (134) is activated.

A secondary benefit of force feedback motors is the ability to more accurately represent the dampened feel of an actual aircraft yoke. In addition to adding friction dampening through the rolling elements, motors can also dampen the actuation of the yoke handle to more closely replicate an aircraft.

Outside of flight simulation, feedback and dampening can enhance a variety of other control devices. As long as dampening introduced from the rolling elements or the motors does not inhibit the ability to make fine adjustment, it can be used to help the user hold the position of the controller in a specific location, make more accurate and precise adjustments, and enhance the feel and user experience of the control device.

Any linear control axis with force feedback or haptic feedback can be configured to communicate various types of information to the user. This can include information about the state of the elements being controlled as well as warnings and alerts. As such, the force feedback and haptic feedback implementations are not limited to flight simulation yokes either.

Elastically Reduced Linear Position Sensing:

A method of reducing the displacement of a linear position sensor has been presented with respect to flight simulation yokes. That being said, the invention can provide value in other control devices and linear position sensing as a whole since an affordable, compact, and simple linear position sensor with a long stroke length does not currently exist. Examples of applications that stand to benefit from the disclosed method includes CNC machines, 3D printers, aircraft, helicopters, drones, unmanned aerial vehicles, remote control aircraft, manufacturing robots, manufacturing machines, surgical robots, surgical machines, vehicles, vessels, spacecraft, fly-by-wire systems, satellites, human-interface-devices, human input devices, prosthetics, or any other device using a linear control axis can benefit from the proposed invention.

Take for example, an application requiring a linear position sensor with a span of 1-meter. Encoders, linear variable differential transformers (LVDTs), long-stroke potentiometers, or mechanical adaptations of angular position sensors may all be considered.

Upon sourcing these components, cost can become extremely prohibitive with a 1-meter stroke length. Using the disclosed system and method, a spring may be implemented to significantly reduce the required stroke length. No prior art method of reducing the linear displacement of a linear position sensor offers the cost-effectiveness, simplicity, size, and performance of the proposed invention. The disclosed system and methods thus open the opportunity for products at all price points to incorporate long-stroke length linear position sensing.

Since linear control devices often undergo frequent user inputs, the linear position sensing methods that are used in these devices may require high cycle-life ratings. For example, flight simulation yokes can easily see millions of cycles on the primary control axes, and premature failure of the spring attachment method or position drift of the spring attachment location over time may cause incorrect sensor outputs and complete failure of the sensing mechanism. The inventor believes that no prior art methods or established conventions are available in the public domain for attaching to a moving spring coil and guaranteeing high cycle life. No prior art methods also exist for attaching to spring coil with low cycle life either.

By contrast, the present discloses methods of clamping sensors to a spring with a formed sheet metal component. This method is cost-effective and extremely durable. That being said, many other methods exist, including soldering, brazing, welding, adhesives, tying, and forming or machining useful features to mount to.

Although reducing the displacement of linear position sensors has been demonstrated using a steel spring, many other elastic elements can be used. These include elastic bands or cords. Attaching to an elastic band or cord may be simpler than attaching to a coil spring because of the ability to easily mold and form features in the elastomer. These features may then be used to attach or embed the linear position sensor. The manufacturing flexibility of elastic bands and cords makes them useful for applications using the elastically reduced linear position sensing method.

Figure 20:
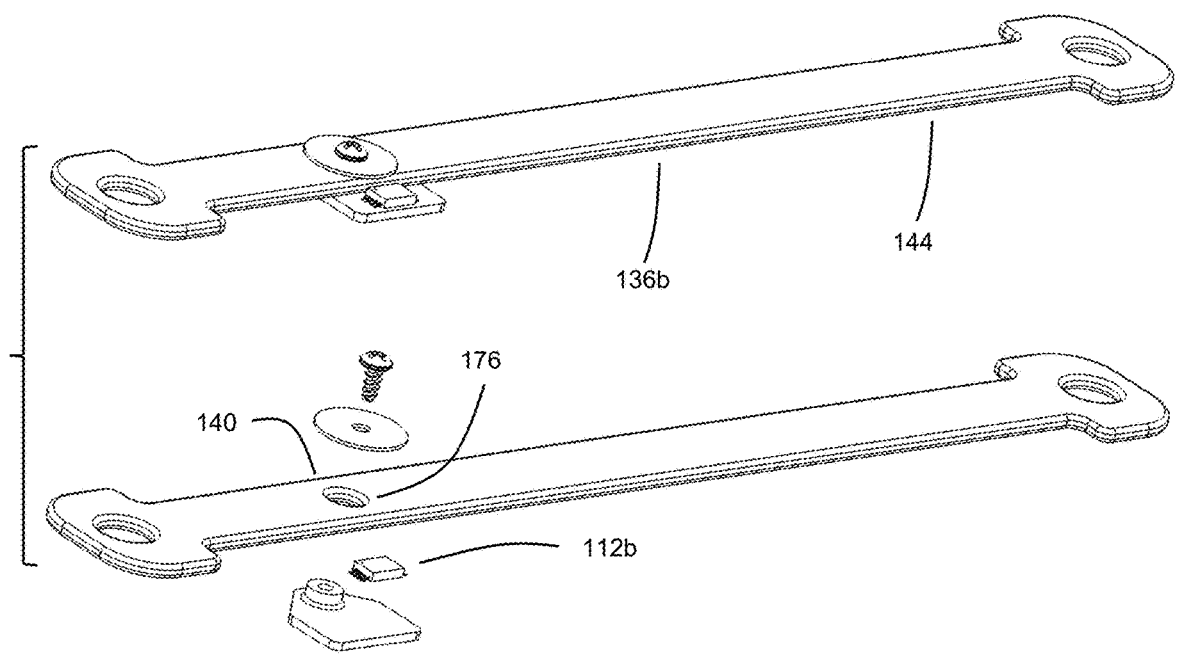
FIG. 20. A method of reducing the displacement of a linear position sensor using an elastic band with a molded feature to attach the sensor. In this case, the sensor is a Hall-effect sensor with a magnet that is hidden from view.

FIG. 20 shows a system and method of reducing the displacement of a linear position sensor (112b) using an elastic band (136b) with a molded feature (176) to attach the sensor. In this case, the sensor is a Hall-effect sensor with a magnet that is hidden from view, but many different linear position sensors (112) and elastic elements (136) could alternatively be used.

Proportional reduction may not be ideal for all applications. For example, a sensor with a non-linear output could be linearized using an elastic element that does not exhibit linear reduction. Elastic elements such as springs or elastic bands can be designed for non-linear displacement reduction to suit the application.

Attaching a linear position sensor to an elastic element can be configured differently depending on the type of sensor. For example, the method illustrated in FIG. 12 could be modified so the magnet (146) is attached to the spring (136a) and the sensor (148) is fixed. The end result is the same. Another embodiment could involve an encoder strip actuated by an elastomer with the emitter and detector remaining fixed. The important commonality here is the reduced span length being measured by the linear position sensor.

Figure 21:
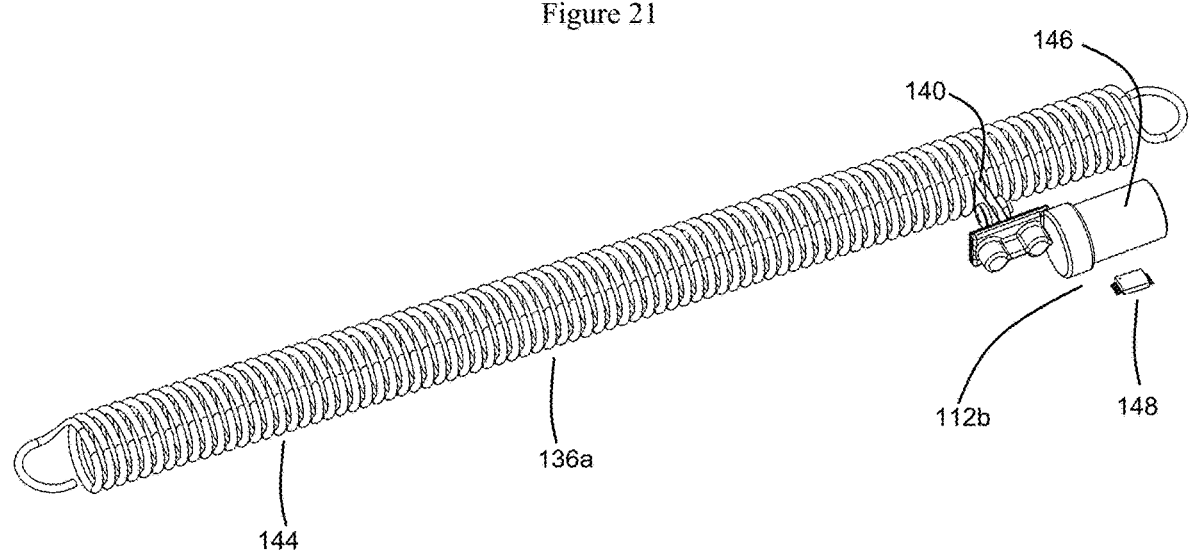
FIG. 21. A configuration using an elastic element to reduce the displacement of a linear position sensor using a stationary Hall-effect sensor and a reduced displacement magnet attached to a spring.

FIG. 21 shows an alternative configuration using an elastic element (136a) to reduce the displacement of a linear position sensor (112b) using a stationary Hall-effect sensor (148) and a reduced displacement magnet (146) attached to a spring (136a).

An embodiment could also involve the entire sensing apparatus or mechanism attached to an elastic element. For example, a magnet could be attached to one coil of a spring, and a Hall-effect sensor could be attached to another coil of the same spring. Since different points on the spring move at different rates, the location of the attachments to the spring can be chosen such that as the spring stretches or contracts the Hall-effect sensor slides past the magnet. The subsequent output of the Hall-effect sensor can then be equated to the linear position of points on the spring or elements attached to the spring. The same applies to other elastic elements such as bands or cords as long as the sensor is actuated a reduced amount during stretching and contracting. An example of a Hall-effect sensor and a magnet that are both attached to an elastic element is shown in FIG. 22.

Figure 22:
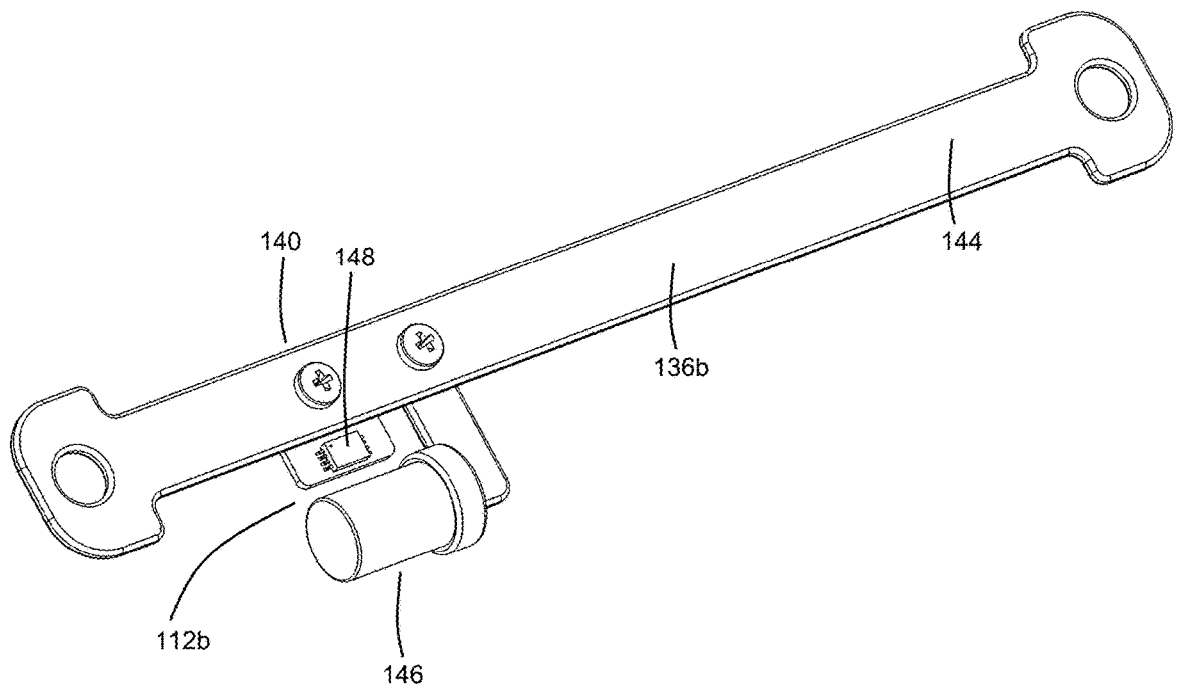
FIG. 22. Linear position sensing configuration where the entire linear position sensor is attached to the elastic element. In this configuration, the linear position sensor comprises a magnet and Hall-effect sensor with each configured to experience differential displacement during stretching.

FIG. 22 shows a linear position sensing configuration where the entire linear position sensor (112b) is attached to the elastic element (136b). In this configuration, the linear position sensor comprises a magnet (146) and Hall-effect sensor (148) with each configured to experience differential displacement during stretching.

Elastic elements can also be used to convert linear displacement to angular displacement. This allows angular position sensors to be cost effectively implemented in linear position sensing applications. Using angular position sensors to measure linear position in flight simulation yokes is usually done with a lever arm and a pivot, or a gear and a gear rack. Both of these implementations have added cost, increased complexity, and the potential for mechanical backlash.

Figure 23:
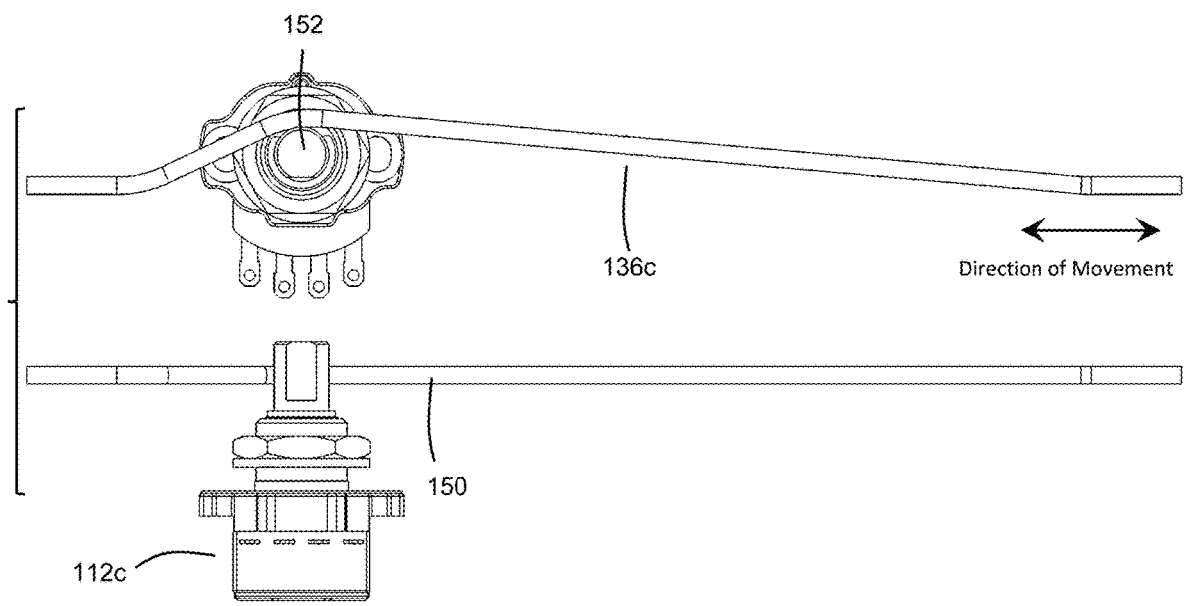
FIG. 23. A linear position sensing device using an elastic element to convert linear displacement to angular displacement while simultaneously reducing the required span of a linear position sensor.

One embodiment of the proposed invention, illustrated in FIG. 23, involves an angular position sensor that rolls along the surface of an elastomer as it is stretched in a linear direction. The output of the angular position sensor can then be correlated to the linear position of points on the elastic element or elements attached to the elastic element based on:
 The circumference of the rotating element.
 Properties and dimensions of the elastic element.
 The location of the point on the elastic element that is in rolling contact with the angular position sensor.

FIG. 23 shows a linear position sensing device using an elastic element (136c) to convert linear displacement to angular displacement, while simultaneously reducing the required span of a linear position sensor (112c). The linear position sensor (112c) is an angular position sensor configured for linear position sensing. The rotating element (152) of the linear position sensor (112c) rolls on an elastic surface (150) of the elastic element (136c) when stretching occurs. Thus, the linear position of points on the elastic element (136c) or elements attached to the elastic element (136c) can be sensed.

When compared to a gear and gear rack where the pinon gear has a pitch diameter equal to the rotating element of the angular position sensor in FIG. 23, the total required span of the angular position sensor can be significantly reduced by placing the angular position sensor closer to the fixed end of the elastic element. This can significantly reduce the cost of the angular position sensor while also being less complex than a gear and gear rack or pivot and lever arm. Backlash present with gear and gear rack systems is also eliminated.

Thus, in some embodiments, the linear control device can further comprise a linear position sensor (112) comprising at least one elastic element (136, such as 136c) comprising at least one elastic surface (150) and at least one rotating element (152). This at least one elastic element (136, such as 136c) can be configured to at least partially stretch and contract along with the movement of the handle (108) and shaft (116) along the linear input axis (110).

In this embodiment, the rotating element (152) may be configured to roll on at least one elastic surface (150) when at least part of this at least one elastic element (136) is stretched by the movement of the handle (108) and shaft (116) along the linear input axis (110). This at least one linear position sensor (112b) is further configured to sense the linear position of one or more sections on the elastic element (136).

As for the other sensors, this at least one linear position (112b) sensor can also be configured to provide location or motion input to the least one processor (200). As before, this at least one processor can be configured to correlate this linear position sensor (112b) input with the movement of the handle (108). Here, this processor is configured to use this at least one linear position sensor (112b) and handle (108) to determine a linear position of the linear input axis (110).

In some embodiments, this linear position sensor (112b) and at least one processor (200) are configured to sense any of displacement, distance, velocity, and acceleration.

Further, as previously discussed, in some embodiments, at least one elastic element (136) and at least one rotating element (152) may further comprise complementary textures or surface features designed to interlock and mesh together during movement, thus reducing sliding and position drift errors.

In some embodiments, the at least one elastic element (136) comprises a spring (136a).

In some embodiments, any of the at least one linear position sensor (112), at least one angular position sensor (142), and at least one processor (200) is configured to sense any of displacement, distance, velocity, and acceleration.

FIG. 25 shows an embodiment with a rolling element (160k) that introduces both rolling and sliding friction along a linear input axis (110) using a rolling contact region (102k) that has points (128a and 128b) at varying distances (130a and 130b) from the axis of rotation (126).

About Sensor Costs:

Cost reduction also stems from the use of angular position sensors in general since linear position sensors typically cost more. Cost savings can become even greater with long stroke length applications.

Other Aspects

Compared to a lever arm and pivot, the disclosed device does not introduce any backlash into the system and does not carry the same size constraints as prior art lever arm or gear mechanisms.

A potential issue with the disclosed system and method is angular position drift over time as the elastic element stretches and contracts, causing the point of rolling contact on the rotating element to move. To solve this, patterns can be integrated into the angular position sensor and elastic element that maintains position during cycling. The concept is similar to the meshing of a gear and gear rack. In this analogy, the elastic element would be the gear rack, and the angular position sensor rotating element would serve as the pinon gear. The rotating element could be manufactured with a pattern that meshes and engages with a corresponding pattern on the elastic element, thereby preventing position drift during cycling.

Coil springs can also be used to convert linear displacement to angular displacement by integrating the aforementioned spring attachment methods. By attaching a surface to a coil of a spring, an angular position sensor can roll along the surface as the spring stretches and contracts linearly.

The linear position simply refers to a value that can be correlated to a point along a linear axis. This output can easily be used to by the at least one processor to sense distance, displacement, velocity, speed, and acceleration.

Handle Variations:

The imagery so far has involved one variation of a flight yoke handle (108). Many different variations of handles can be used in a flight yoke as long as the user can pull and push the yoke along the elevator axis (110) and rotate the yoke about the aileron axis (120). Other linear control applications may also include a variety of handles.

Reducing the Displacement of Other Elements

Methods of reducing the displacement of linear position sensors can also be applied to any application where the linear displacement of an element must be reduced in a simple, cost-effective, and precise manner.

Further Notes

An important aspect of the disclosed system and method is with regards to creating a yoke system that is robust with respect to manufacturing tolerances and variability. For example, linear travel is a predominant theme in the invention, but when components making up the linear guide and linear sensing mechanisms are manufactured and assembled, the path of travel may not be perfectly linear. The system disclosed here is designed to cope with features that deviate from being perfectly linear, parallel, axial, round, etc., due to manufacturing tolerances and imperfections present in real-world applications.

Compliant Material and Durometer Discussion:

The specifications for the compliant material were determined in part by engineering analysis and in part by experiment, both of which are described below.

Creating an affordable linear guide for a flight simulation yoke with realism, durability, and performance that exceeds linear ball bearing guides, plain bearings, and bushings requires a compliant material at the rolling contact region. The properties of the compliant material must successfully balance the following:

1. The ability to compensate for manufacturing tolerances, surface imperfections, misalignment, dust, dirt, and debris to maintain a smooth, quiet, and precise actuation along the linear input axis.
2. The ability to maintain sufficient rigidity in the presence of forces from centering springs, centering motors, actuators, other centering force elements, user input force, and any other forces that must be supported by the linear guide of the flight yoke.
3. The ability to create a linear guide with minimal to no free play without expensive manufacturing tolerances.
4. The ability for the compliant material to maintain shape and integrity after prolonged or repeated stress and deformation as well as impact to the system.
5. The ability of the material to accurately replicate the feel of an aircraft controls.
6. The ability to function at a range of temperatures without damage.

With these requirements in mind, polymers will be selected as the ideal material class for the compliant material. Although there are many other materials that may work, the scope of the compliant material will be limited to polymeric materials. It is important to note fillers and impurities in the polymer is allowable, and the compliant material does not need to be 100% pure polymer. An ideal range for the polymer properties that strikes a balance between the requirements will be discussed.

Instruments Used:
1. Rex 1600 Type D Durometer Gauge
2. Rex 1600 Type A Durometer Gauge
3. Rex 1600 Type 00 Durometer Gauge Note: Many other instruments and methods may be used to determine the durometer of a compliant material.

Creep and Compression Set:

Using a compliant material at the rolling contact region gives way to cost effective methods of eliminating free-play in the yoke. Manufacturing ball bearing linear guides, bushing linear guides, and sliding linear plain bearing guides with minimal to no free play requires costly tolerances. Free play can be eliminated in the proposed invention by ensuring at least two rolling elements are in contact with their respective surfaces. Adjustability in the location of the rolling elements and surfaces combined with a compliant material at the rolling contact region can allow free-play to be eliminated. Doing so often requires slightly deforming the compliant material at the rolling contact region so the material can rebound to account for tolerances and imperfections thereby eliminating free play. This slight deformation combined with other forces on the compliant material leads to material selection challenges due to permanent set and creep in polymers.

When the linear input axis is resting in one position for extended periods of time, the compliant material comprising the rolling contact region may not return to its original shape once the linear input axis is moved to a new position. For example, a cylindrical polyurethane rolling element resting on a surface in one position for an extended period will develop a small flat spot at the location the polyurethane contacted the surface. With sufficient deformation, rolling over this flat spot will be felt by the user as a detent on the linear input axis. Detents negatively affect the user experience and make precise adjustment difficult. The size of this deformation can be very small and still be noticeable to the user.

Depending on the conditions, the indentation may be permanent or temporary. The compliant material may only take a few seconds to rebound, or it may never fully rebound. Ideally, the compliant material will return to the original shape as quickly as possible. These indentations may be caused by creep and compression set in the material. Therefore, the stress in the material does not have to exceed the yield strength of the material to cause permanent deformation and detents.

The following can be optimized to lower the probability of detents on the linear input axis:
Optimizing durometer. In many polymers, an ideal durometer range can be found to minimize creep and compression set.
Less pressure on the compliant material at the rolling contact region. Increasing the rolling contact region area can be used to reduce the pressure on the compliant material.
Cross linking in the polymer.
High yield strength.
Highly crystalline structures within the polymer.

Various polymer rolling elements under identical conditions and loading were tested in a linear guide mechanism in a flight yoke. The objective was to determine which materials rebound quickly after being stored in a deformed state for extended periods. Since the objective is to avoid detents, the performance ranking of the materials was based on whether a perceptible detent existed on the linear input axis after the rolling elements were stored in a deformed state. The polymers tested can be broken into two categories: thermoplastics and thermosets. Due to the material limitations, the durometers of the thermoplastics are higher than the thermosets.

TABLE 1

| Materials Tested | |
|---|---|
| Thermoset | Thermoplastic |
| Polyurethane 60A | ABS 90D |
| Silicon 60A | Nylon 6 75D |
| EPDM 60A | Polyoxymethylene 85D |

Thermosets outperformed thermoplastics with silicon and polyurethane offering the best performance. Although there may be thermoplastics that offer better creep and compression set performance, thermosets will usually outperform in this category often due to increased cross linking. On the other hand, thermoplastics generally outperform thermosets in terms of manufacturability, making thermoplastic elastomers (TPE's) and attractive middle ground.

Optimizing the compression set and creep performance of the compliant material goes beyond material selection. In further testing with polyurethane rolling elements, increasing the durometer was found to have beneficial effects on compression set and creep performance in polyurethane. Polyurethane rolling elements having durometers of 65A, 70A, 75A, 80A, 85A, 90A, 95A, and 100A were tested. Although each durometer tested was viable, as the durometer increased, the severity and duration of the detents in the yoke gradually decreased. In no cases were the detents permanent with the polyurethane compositions that were tested. It should be noted, durometer increases may have varying effects based on the material type. Additionally, the trend may not continue throughout the durometer scale in polyurethane.

Temperature Considerations

Temperature also plays a significant role in predicting creep and compression set. During shipping in containers, temperatures can reach up to 135 F. With thermoplastic elastomers especially, increased temperatures can increase the severity of creep and compression set as the melting point is approached. Since distribution often requires shipping containers and freight trucks, selecting a polymer with a melting point below or near 135 F is not ideal. Materials without a melting point, such as thermosets, can also mitigate these issues.

Extreme cold also poses challenges when selecting a compliant material. The glass transition point of a polymer is the temperature a polymer becomes hard and brittle. Going below the glass transition temperature may cause the compliant material to fracture. This is less of an issue during shipping since the linear input axis is largely stationary. Fracturing is most likely to occur if the linear input axis is actuated when the compliant material is below the glass transition temperature. Materials with a glass transition temperature below 40 F are ideal for the application.

Impact and Rebound Resilience:

Impact to the handle of a flight simulation yoke may damage the compliant material comprising the rolling contact region. Indentations from impact can also cause detents on the linear input axis. The compliant material should be able to withstand reasonable impact to the handle without sustaining detectable permanent deformation or damage to the compliant material. This generally requires materials with a degree of elasticity.

Manufacturing Tolerances, Binding, Noise, and Grittiness:

At high durometers, polymers will begin to exhibit similar issues to linear ball bearing guides. The material will no longer be able to account for manufacturing tolerances, misalignment, surface imperfections, and debris causing noise, grittiness, and binding. A maximum durometer limit exists for a compliant material having the ideal ability to account for imperfections and maintain smooth, silent, and precise actuation.

Various durometers were tested to find the durometer upper limit. The tested durometers were 90A, 95A, 100A, 60D, 65D, 70D, 75D, 80D, and 85D. At 75D, the linear guide began to create unacceptable noise and grittiness and was less capable of accounting for manufacturing tolerances. The tested durometers at and below 70D functioned appropriately. Durometers 70D and higher may still function, but their performance may not be optimal.

Rigidity:

Poor rigidity can be mitigated by increasing the durometer of the compliant material. Raising the durometer above 70D to enhance rigidity may cause issues. Doing so could compromise performance and the ability to account for tolerances and imperfections. A lower durometer limit that defines the softest polymer capable of maintaining sufficient rigidity in the linear guide exists.

Determining the lower durometer limit involves testing the rigidity of progressively softer polymers at the rolling contact region in a flight simulation yoke. Rigidity was quantified by the deflection of the yoke handle under constant force. The following durometers were tested: 70A, 65A, 60A, 55A, 50A, 45A, 40A, 35A, 30A, 25A, 20A, 15A, 10A, 60OO, 55OO, 50OO, 45OO, 40OO, and 35OO. At 35OO the rigidity became suboptimal, and the lower durometer limit of an ideal compliant material was determined to be 40OO. For durometers at the softer end of the range, decreasing the thickness of the compliant material may be required to maintain rigidity.

Feel and Realism:

If the linear guide invention is used in a flight simulation yoke, it is crucial the feel created by the compliant material accurately replicates the feel of flying an aircraft. Doing so may require introducing friction dampening at the rolling contact region. Balancing a realistic feel with the aforementioned requirements requires choosing the correct durometer for compliant material.

A flight simulation yoke having friction dampening rolling elements to guide the linear input axis was tested with the following durometers: 40OO, 45OO, 50OO, 55OO, 60OO, 10A, 15A, 20A, 25A, 30A, 35A, 40A, 45A, 50A, 55A, 60A, 65A, 70A, 75A, 80A, 90A, 95A, 100A, 60D, 65D, 70D, 75D, and 80D.

Although all durometers tested functioned in the linear guide, the most realistic feel for flight simulation yokes was found to range from 5A to 65D. Although designed for flight simulation yokes, the feel created in this durometer range may have applications outside of flight simulation.

In some embodiments, the compliant material (106) is configured with a durometer between 0 Shore A to 100 Shore A.

In some embodiments, the compliant material (106) is configured with a durometer between 0 Shore D to 70 Shore D.

In some embodiments, the compliant material (106) is configured with a durometer between 5 Shore A to 65 Shore D.

In some embodiments, the compliant material (106) is configured with a durometer between 10 Shore A to 60 Shore D.

Note that in this discussion, the durometer range assumes that the temperature of the compliant material is approximately room temperature. That is, between about 70 F and 80 F when the durometer is evaluated. This is based on the assumption that 70 F to 80 F is the normal operating temperature where the device functions optimally. The device may be used outside of this optimal temperature range, of course. Note also that in these experiments, the durometer was measured when the material is not in rolling contact or under other forces or loads that would alter the durometer value from when the material is configured in the device.

The invention claimed is:

1. A linear control device, said device comprising:
    a moveable handle configured to actuate both a linear input axis and a rotational input axis;
    at least one v-groove rolling element, at least one guide tube, and rolling elements comprising at least one cylindrical rolling element and at least one u-groove rolling element;
    a compliant material configured with a durometer between 40 Shore 00 to 70 Shore D;
    said compliant material comprising a polymeric material;
    said rolling elements configured for actuation of at least said linear input axis;
    at least one linear position sensor and at least one angular position sensor;
    at least one processor;
    wherein at least one said v-groove rolling element is configured to at least partially constrain movement of said handle along said linear input axis;
    wherein at least at a portion of said at least one cylindrical rolling element, at least one u-groove rolling element, and at least one v-groove rolling element comprises a rolling contact region comprising said compliant material;
    wherein said at least one u-groove rolling element is configured to run along a guide tube;
    further comprising a handle shaft with a handle shaft length and a handle shaft axis, said handle shaft attached to said moveable handle;
    said handle shaft configured with a linear guide apparatus comprising a carriage comprising at least one said rolling elements, and at least one flat surface on which the rolling elements roll, said linear guide apparatus configured to only move in one dimension parallel to said handle shaft length, thus creating a linear input axis;
    wherein said guide tube is configured to constrain movement of the carriage along a linear path;
    said handle shaft further configured to rotate about said handle shaft axis, thus creating a rotational input axis;
    said linear control device further configured so that said at least one v-groove rolling element is in contact with said handle shaft;
    said handle shaft further configured so that said at least one v-groove rolling element in contact with said handle shaft undergoes sliding friction when said rotational input axis is actuated;
    and wherein said at least one processor is configured to receive input from any of said at least one linear position sensor and said at least one angular position sensor, and to use said input to produce an output responsive to at least a position of said moveable handle.

2. The linear control device of claim 1, further comprising at least one guide tube fine adjustment control configured to apply adjustable pressure on said at least one u-groove rolling element's at least one rolling contact region.

3. The linear control device of claim 1, further comprising at least one linear actuator configured to apply force to said least one rolling contact region, thereby exerting a linear force on said handle;
said linear actuator and said at least one processor further configured to provide any of force feedback, haptic feedback, vibration feedback, warnings, alerts, or other feedback to said handle.

4. The linear control device of claim 3, wherein said rolling contact region further comprises any of textures and surface features designed to interlock and mesh together during movement, thus allowing for higher torque transmission when said linear actuator is activated.

5. The linear control device of claim 1, further comprising at least one rotational actuator configured to apply torque about said rotational input axis and to said handle;
said at least one rotational actuator and said at least one processor further configured to provide any of torque mediated force feedback, haptic feedback, vibration feedback, warnings, alerts, and/or other feedback to said handle.

6. The linear control device of claim 1, wherein said linear position sensor further comprises at least one elastic element configured to at least partially stretch and contract along with movement of said handle along said linear input axis;
further comprising at least one stationary element that does not move along with said handle and said at least part of said at least one elastic element;
said at least part of said at least one elastic element and said at least one stationary element configured to experience differential displacement during said movement of said handle so that at least a first point on said elastic element experiences a lesser displacement than a second point on said elastic element;
said at least one linear position sensor configured to sense at least said first point on said elastic element;
said at least one linear position sensor configured to provide input to said at least one processor, and said at least one processor is configured to correlate said linear position sensor input with said movement of said handle.

7. The linear control device of claim 6, wherein said linear position sensor and said at least one processor are configured to sense any of displacement, distance, velocity, and acceleration.

8. The linear control device of claim 6, wherein said linear position sensor comprises at least one magnet and Hall-effect sensor, said magnet and Hall-effect sensor configured with at least one of said magnet and Hall-effect sensor disposed on or in said elastic element, and the other of said at least one magnet and Hall-effect sensor disposed on or in said at least one stationary element;
said elastic element configured so that a given movement of said handle along said linear input axis is translated into a fraction of said given movement of any of said at least one magnet and Hall-effect sensor.

9. The linear control device of claim 1, further comprising at least one elastic element comprising at least one elastic surface and at least one rotating element of said linear position sensor, said at least one elastic element configured to at least partially stretch and contract along with movement of said handle along said linear input axis;
wherein said rotating element is configured to roll on said at least one elastic surface when said at least part of said at least one elastic element is stretched by movement of said handle along said linear input axis, and said at least one linear position sensor is further configured to sense the linear position of one or more sections on said elastic element;
said at least one linear position sensor configured to provide input to said at least one processor, and said at least one processor is configured to correlate said linear position sensor input with said movement of said handle; and
wherein said at least one linear position sensor and said handle is configured to determine a linear position of a linear input axis.

10. The linear control device of claim 9, wherein said linear position sensor and said at least one processor are configured to sense any of displacement, distance, velocity, and acceleration.

11. The linear control device of claim 9, wherein said at least one elastic element and said at least one rotating element further comprise complementary textures or surface features designed to interlock and mesh together during movement, thus reducing sliding and position drift errors.

12. The linear control device of claim 9, wherein said at least one elastic element comprises a spring.

13. The linear control device of claim 1, wherein any of said at least one linear position sensor, said at least one angular position sensor, and said at least one processor are configured to sense any of displacement, distance, velocity, and acceleration.

14. The linear control device of claim 1, wherein said compliant material is configured with a durometer between 0 Shore A to 100 Shore A.

15. The linear control device claim 1, wherein said compliant material is configured with a durometer between 0 Shore D to 70 Shore D.

16. The linear control device of claim 1, wherein said compliant material is configured with a durometer between 5 Shore A to 65 Shore D.

17. The linear control device of claim 1, wherein said compliant material is configured with a durometer between 10 Shore A to 60 Shore D.

* * * * *